US012603887B1

(12) United States Patent
Tisdell et al.

(10) Patent No.: US 12,603,887 B1
(45) Date of Patent: Apr. 14, 2026

(54) SYSTEMS AND METHODS FOR GPS-BASED EMERGENCY INCIDENT MANAGEMENT WITH DYNAMIC BOUNDARY CONTROL AND AUTOMATED RESOURCE TRACKING

(71) Applicant: Integrated Communications Solutions, Inc., Georgetown, TX (US)

(72) Inventors: Kevin Tisdell, Georgetown, TX (US); Ronald Kelly Tisdell, Austin, TX (US); Bhumesh Konda, Georgetown, TX (US); Ronny Wilson, Georgetown, TX (US)

( * ) Notice: Subject to any disclaimer, the term of this patent is extended or adjusted under 35 U.S.C. 154(b) by 0 days.

(21) Appl. No.: 19/410,702

(22) Filed: Dec. 5, 2025

(51) Int. Cl.
*H04L 9/40* (2022.01)
*H04W 4/021* (2018.01)

(52) U.S. Cl.
CPC ............ *H04L 63/101* (2013.01); *H04L 63/20* (2013.01); *H04W 4/021* (2013.01)

(58) Field of Classification Search
CPC ....... H04L 63/101; H04L 63/20; H04W 4/021
See application file for complete search history.

(56) References Cited

U.S. PATENT DOCUMENTS

| | | | | |
|---|---|---|---|---|
| 12,490,072 | B1 * | 12/2025 | Heneka | ................... H04W 4/90 |
| 2013/0197951 | A1 * | 8/2013 | Watson | ................... G06Q 50/26 |
| | | | | 705/7.12 |
| 2021/0400459 | A1 * | 12/2021 | Wickham | ................ H04W 4/90 |

* cited by examiner

*Primary Examiner* — Izunna Okeke
(74) *Attorney, Agent, or Firm* — The Rapacke Law Group, P.A.

(57) ABSTRACT

A computer-implemented emergency incident management system includes a situation management module that generates digital incident situations with unique identifiers and assigns administrative control to situation owners and administrators. A geofencing module establishes GPS-based geofences comprising adjustable center points and adjustable radii defining physical incident areas that may be adjusted in real-time as incidents evolve. An access control module validates credentials at situation-level, agency-level, team-level, and individual-level before granting access to responder users. A resource tracking module receives GPS location data from responder computing devices, compares GPS coordinates to geofence boundaries, and selectively displays GPS locations on map interfaces when responders are within geofence boundaries while suppressing display when outside. A communication module automatically generates general communication channels and creates encrypted communication channels based on security classification requirements. The system generates comprehensive audit trails and formats incident data for FEMA compliance and reimbursement documentation.

15 Claims, 8 Drawing Sheets

END-TO-END SYSTEM OPERATIONAL FLOW ⌐ 800

810 ⌐ RECEIVE SITUATION CREATION REQUEST FROM SITUATION OWNER VIA NETWORK

820 ⌐ CREATE DIGITAL INCIDENT SITUATION AND ESTABLISH GPS-BASED GEOFENCE WITH ADJUSTABLE CENTER POINT AND RADIUS

830 ⌐ RECEIVE AND PROCESS ACCESS REQUESTS FROM MULTIPLE RESPONDER USERS WITH MULTI-LEVEL PERMISSION VALIDATION

840 ⌐ GRANT OR DENY ACCESS BASED ON SITUATION OWNER APPROVAL, CREDENTIALS, AND TEAM ASSIGNMENTS

850 ⌐ MONITOR GPS LOCATIONS OF APPROVED RESPONDER RESOURCES WITHIN GEOFENCE AND TRACK MOBILIZATION/DEMOBILIZATION

860 ⌐ DISPLAY RESOURCE LOCATIONS ON MAP INTERFACE WHEN WITHIN GEOFENCE BOUNDARIES AND SUPPRESS WHEN OUTSIDE

870 ⌐ PROVIDE MULTI-CHANNEL COMMUNICATIONS COMPRISING GENERAL CHANNEL AND PRIVATE ENCRYPTED CHANNELS

880 ⌐ GENERATE COMPREHENSIVE TIMESTAMPED AUDIT RECORDS DOCUMENTING ALL ACTIVITIES

890 ⌐ FORMAT AND TRANSMIT INCIDENT DATA TO FEMA NATIONAL INCIDENT MANAGEMENT SYSTEM FOR COMPLIANCE REPORTING

COMPUTING SYSTEM 100

MEMORY 120

APPLICATION INSTRUCTIONS 140

DATA STORAGE 150

BUS 180

PROCESSOR 110

I/O DEVICE(S) 130

INTERFACE(S) 160

NETWORK INTERFACE 165

USER INTERFACE 170

PERIPHERAL DEVICE INTERFACE 175

NETWORK 190

USER COMPUTING DEVICE 145

ADMINISTRATOR COMPUTING DEVICE 185

THIRD-PARTY COMPUTING DEVICE 195

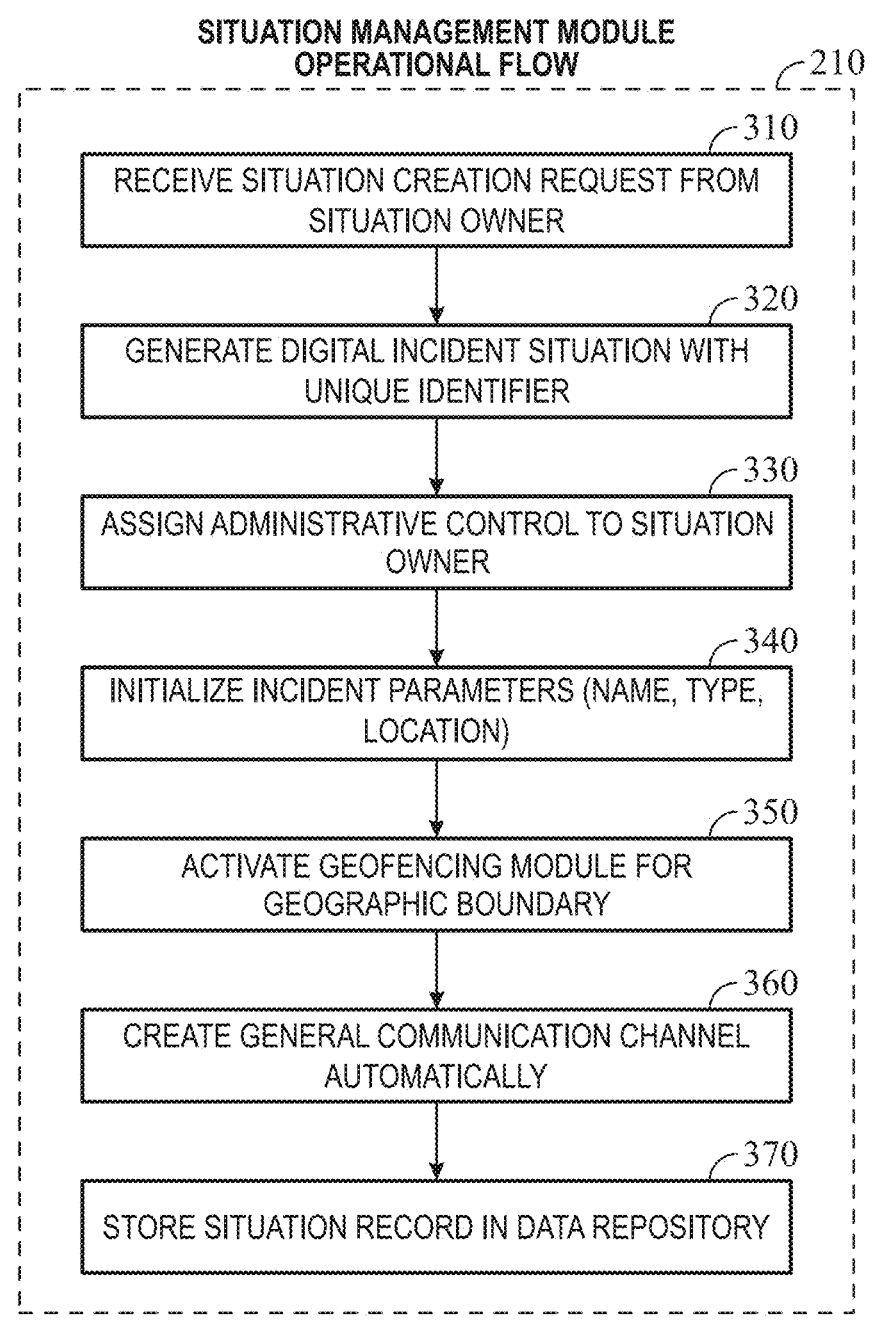

**SITUATION MANAGEMENT MODULE
OPERATIONAL FLOW** 210

310 RECEIVE SITUATION CREATION REQUEST FROM SITUATION OWNER

320 GENERATE DIGITAL INCIDENT SITUATION WITH UNIQUE IDENTIFIER

330 ASSIGN ADMINISTRATIVE CONTROL TO SITUATION OWNER

340 INITIALIZE INCIDENT PARAMETERS (NAME, TYPE, LOCATION)

350 ACTIVATE GEOFENCING MODULE FOR GEOGRAPHIC BOUNDARY

360 CREATE GENERAL COMMUNICATION CHANNEL AUTOMATICALLY

370 STORE SITUATION RECORD IN DATA REPOSITORY

*FIG. 3*

RESOURCE TRACKING MODULE
OPERATIONAL FLOW _ 240

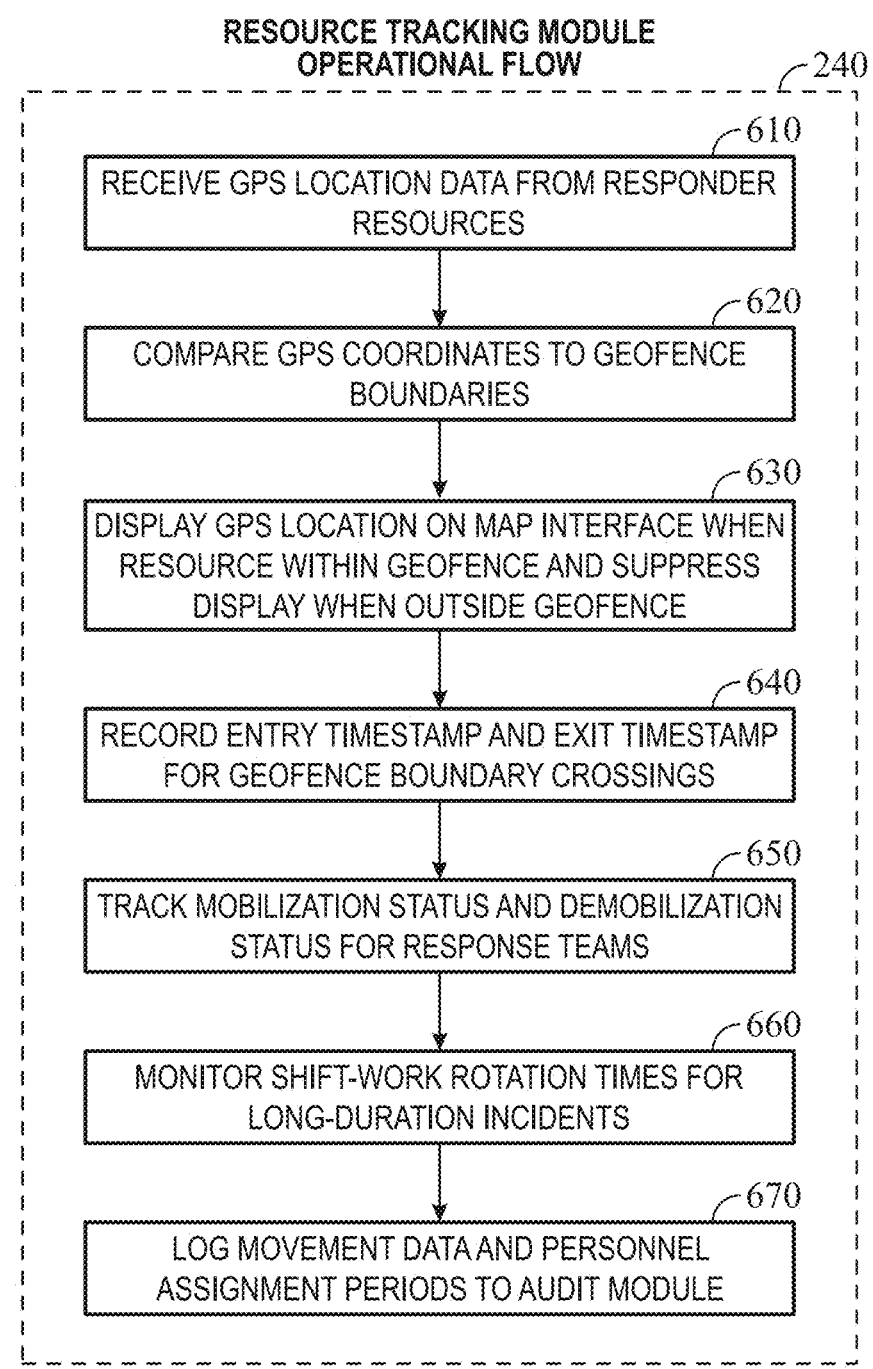

610
RECEIVE GPS LOCATION DATA FROM RESPONDER
RESOURCES

620
COMPARE GPS COORDINATES TO GEOFENCE
BOUNDARIES

630
DISPLAY GPS LOCATION ON MAP INTERFACE WHEN
RESOURCE WITHIN GEOFENCE AND SUPPRESS
DISPLAY WHEN OUTSIDE GEOFENCE

640
RECORD ENTRY TIMESTAMP AND EXIT TIMESTAMP
FOR GEOFENCE BOUNDARY CROSSINGS

650
TRACK MOBILIZATION STATUS AND DEMOBILIZATION
STATUS FOR RESPONSE TEAMS

660
MONITOR SHIFT-WORK ROTATION TIMES FOR
LONG-DURATION INCIDENTS

670
LOG MOVEMENT DATA AND PERSONNEL
ASSIGNMENT PERIODS TO AUDIT MODULE

*FIG. 6*

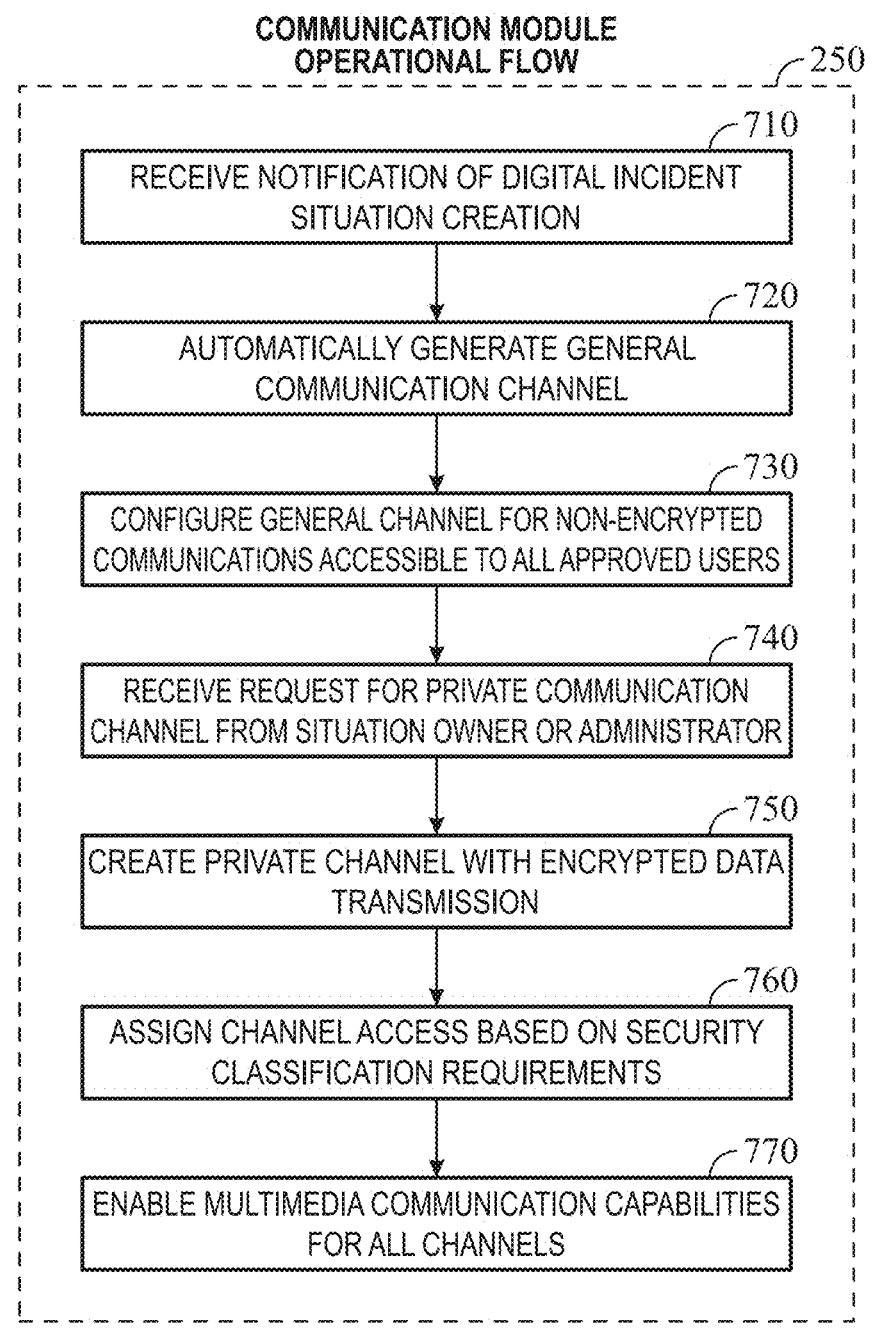

COMMUNICATION MODULE
OPERATIONAL FLOW                           250

710
RECEIVE NOTIFICATION OF DIGITAL INCIDENT
SITUATION CREATION

720
AUTOMATICALLY GENERATE GENERAL
COMMUNICATION CHANNEL

730
CONFIGURE GENERAL CHANNEL FOR NON-ENCRYPTED
COMMUNICATIONS ACCESSIBLE TO ALL APPROVED USERS

740
RECEIVE REQUEST FOR PRIVATE COMMUNICATION
CHANNEL FROM SITUATION OWNER OR ADMINISTRATOR

750
CREATE PRIVATE CHANNEL WITH ENCRYPTED DATA
TRANSMISSION

760
ASSIGN CHANNEL ACCESS BASED ON SECURITY
CLASSIFICATION REQUIREMENTS

770
ENABLE MULTIMEDIA COMMUNICATION CAPABILITIES
FOR ALL CHANNELS

*FIG. 7*

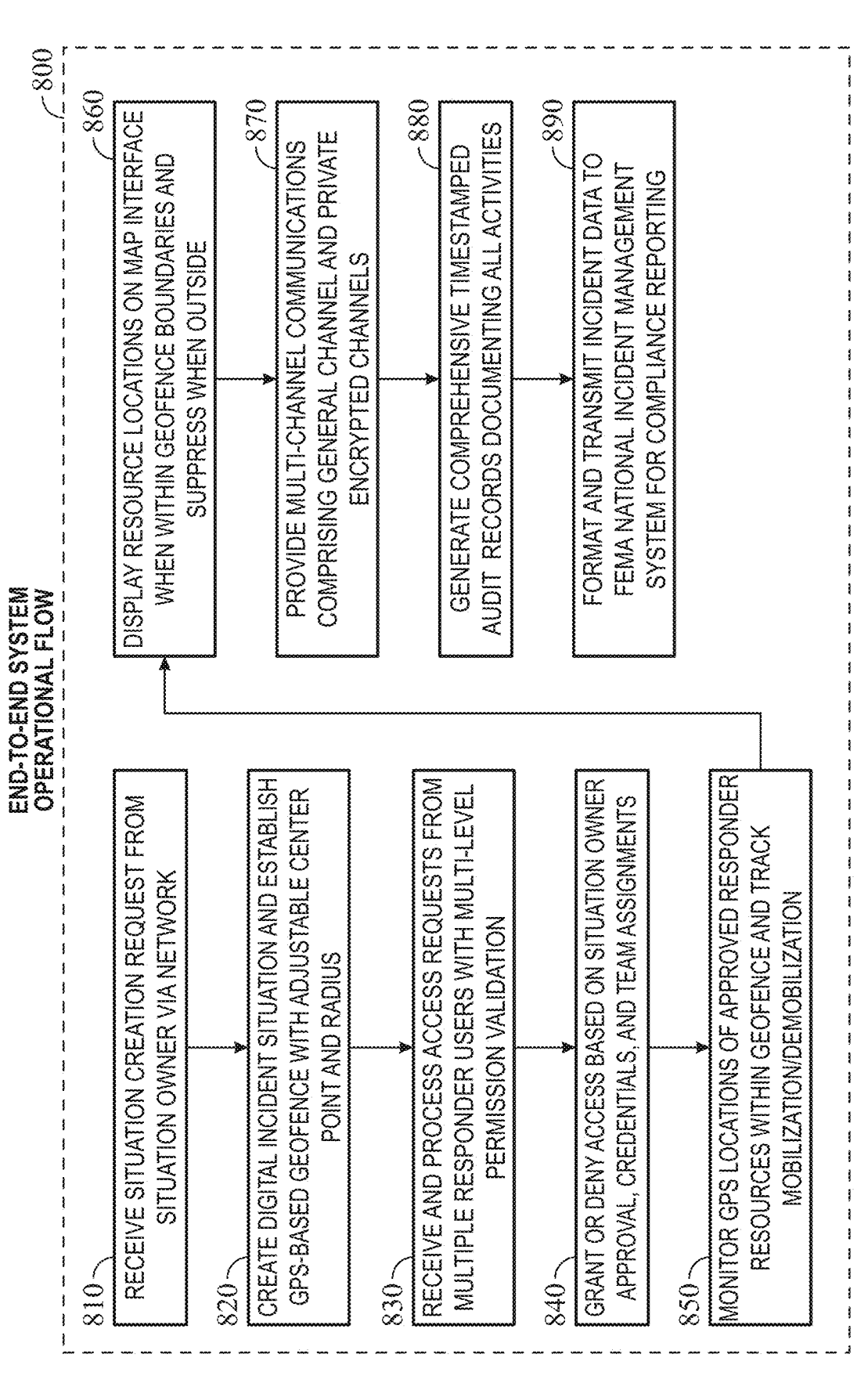

END-TO-END SYSTEM
OPERATIONAL FLOW

800

810 — RECEIVE SITUATION CREATION REQUEST FROM SITUATION OWNER VIA NETWORK

820 — CREATE DIGITAL INCIDENT SITUATION AND ESTABLISH GPS-BASED GEOFENCE WITH ADJUSTABLE CENTER POINT AND RADIUS

830 — RECEIVE AND PROCESS ACCESS REQUESTS FROM MULTIPLE RESPONDER USERS WITH MULTI-LEVEL PERMISSION VALIDATION

840 — GRANT OR DENY ACCESS BASED ON SITUATION OWNER APPROVAL, CREDENTIALS, AND TEAM ASSIGNMENTS

850 — MONITOR GPS LOCATIONS OF APPROVED RESPONDER RESOURCES WITHIN GEOFENCE AND TRACK MOBILIZATION/DEMOBILIZATION

860 — DISPLAY RESOURCE LOCATIONS ON MAP INTERFACE WHEN WITHIN GEOFENCE BOUNDARIES AND SUPPRESS WHEN OUTSIDE

870 — PROVIDE MULTI-CHANNEL COMMUNICATIONS COMPRISING GENERAL CHANNEL AND PRIVATE ENCRYPTED CHANNELS

880 — GENERATE COMPREHENSIVE TIMESTAMPED AUDIT RECORDS DOCUMENTING ALL ACTIVITIES

890 — FORMAT AND TRANSMIT INCIDENT DATA TO FEMA NATIONAL INCIDENT MANAGEMENT SYSTEM FOR COMPLIANCE REPORTING

FIG. 8

SYSTEMS AND METHODS FOR GPS-BASED EMERGENCY INCIDENT MANAGEMENT WITH DYNAMIC BOUNDARY CONTROL AND AUTOMATED RESOURCE TRACKING

The embodiments generally relate to the technical field of computer-based emergency incident management and response coordination systems for multi-agency operations.

BACKGROUND

Conventional emergency incident management systems are designed to facilitate communication and coordination among emergency responders during operational incidents. Such systems often operate as part of broader public safety platforms or as integrated modules within dispatch and command center software, traditionally using tower-based radio systems to communicate and coordinate resource allocations.

These systems typically support the storage and organization of incident reports, resource deployment records, and communication logs. Many employ manual processes to track responder locations, verify personnel credentials, and coordinate multi-agency response activities based on dispatcher coordination and supervisor oversight. Paper-based incident command systems and radio communications remain common, requiring supervisors to manually document resource assignments, track personnel locations through verbal check-ins, and coordinate access permissions through radio communications with multiple agencies across variable radio frequencies that are not compatible between agencies for true interoperable agency communications Conventional solutions may also generate reports or analytics summarizing incident response activities and resource utilization. These reports are often used by incident commanders to assess operational effectiveness and allocate resources. In many cases, resource tracking within these systems is based on manual status updates, requiring responders to periodically report their locations and activities rather than providing continuous situational awareness.

While such systems provide efficiencies in documenting incident response procedures, they face challenges in providing real-time visibility into individual and team responder locations relative to incident boundaries, maintaining dynamic access control as incident scope evolves, or enforcing geographic-based resource tracking without manual oversight. Personnel credentials and qualifications are often maintained in separate databases disconnected from operational access control workflows, enabling unauthorized personnel to gain access to incident operations. Additionally, resource location data is typically recorded through manual reporting rather than integrated automatically from GPS-enabled devices.

Consequently, there is a need for an improved verbal and non-verbal communication and more streamline incident management system that addresses the limitations of tower-based radio incompatibility between unrelated agencies, manual coordination approaches, reducing reliance on radio-based status reporting, and provides enhanced integration between geofencing technology, access control workflows, GPS-based resource tracking, and multi-channel non-verbal communications.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

In one aspect, the disclosed system, method, or software product may include a situation management module configured to generate digital incident situations with unique identifiers and to assign administrative control to situation owners. The module may establish incident parameters including name, type, and location, and may automatically activate geofencing and communication capabilities upon situation creation. The term "situation" as used herein encompasses both traditional emergency incidents such as fires, hazardous material responses, active threats, and natural disasters, as well as planned events requiring multi-agency coordination and communication such as music festivals, large sporting events, public gatherings, and other scenarios where resource management and controlled access are beneficial but where an "incident" in the emergency response sense may not be occurring. The module may establish incident parameters including name, type, and location, and may automatically activate geofencing and communication capabilities upon situation creation.

In one aspect, embodiments may include a geofencing module configured to establish GPS-based geofences comprising adjustable center points and radii defining physical incident areas. The module may enable dynamic adjustment of geofence parameters during incident evolution, enabling situation owners to modify center point coordinates or radius dimensions in real-time as incident boundaries change.

In one aspect, embodiments may include an access control module configured to receive access requests from responder users and to validate credentials at multiple permission levels including situation-level, agency-level, team-level, and individual-level. The module may process approval or denial decisions from situation owners or administrators, preventing unauthorized access to incident operations.

In one aspect, embodiments may include a resource tracking module configured to receive GPS location data from responder computing devices and to compare GPS coordinates to geofence boundaries. The module may selectively display resource locations on map interfaces when resources are within geofence boundaries and suppress display when outside boundaries, and may track mobilization status, demobilization status, and shift-work rotation times for response teams.

In one aspect, embodiments may include a communication module configured to automatically generate general communication channels accessible to all approved users upon situation creation. The module may create private encrypted communication channels in response to requests from situation owners or administrators based on channel type requirements, enabling agency-specific or role-specific communications. In all implementations, communication data is protected by Transport Layer Security (TLS) encryption for data in transit and operating system-level encryption for data at rest, with access to communication data determined by channel type and user associations with the digital incident situation or specific communication channels.

In one aspect, embodiments may include an audit module configured to generate comprehensive timestamped records documenting assigned user roles, access requests, approval decisions, GPS location data, geofence boundary crossings, mobilization events, and communication activities. The module may create verifiable audit trails that log every system action and field condition throughout incident life-cycles.

In one aspect, embodiments may include a user interface module configured to provide interactive map rendering with geofence visualization, situation creation and editing interfaces, member profile displays, communication channel interfaces, and real-time GPS position updates. The module may enable field-based interaction through mobile computing devices.

In some aspects, the system may include at least one computing device in operable communication with a network and a server in operable communication with the network to host an incident management and communication platform containing the above-described modules. The computing device may execute instructions to perform the operations described herein, thereby enabling automated, GPS-driven, and access-controlled emergency response coordination that maintains real-time situational awareness and prevents unauthorized participation in incident operations.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein:

FIG. 3 is a flow diagram illustrating an exemplary operational sequence of the Situation Management Module, according to some embodiments;

FIG. 6 is a flow diagram illustrating an exemplary operational sequence of the Resource Tracking Module, according to some embodiments;

FIG. 7 is a flow diagram illustrating an exemplary operational sequence of the Communication Module, according to some embodiments; and FIG. 8 is a flow diagram illustrating an exemplary end-to-end system operational flow, according to some embodiments.

DETAILED DESCRIPTION

Figure 1:
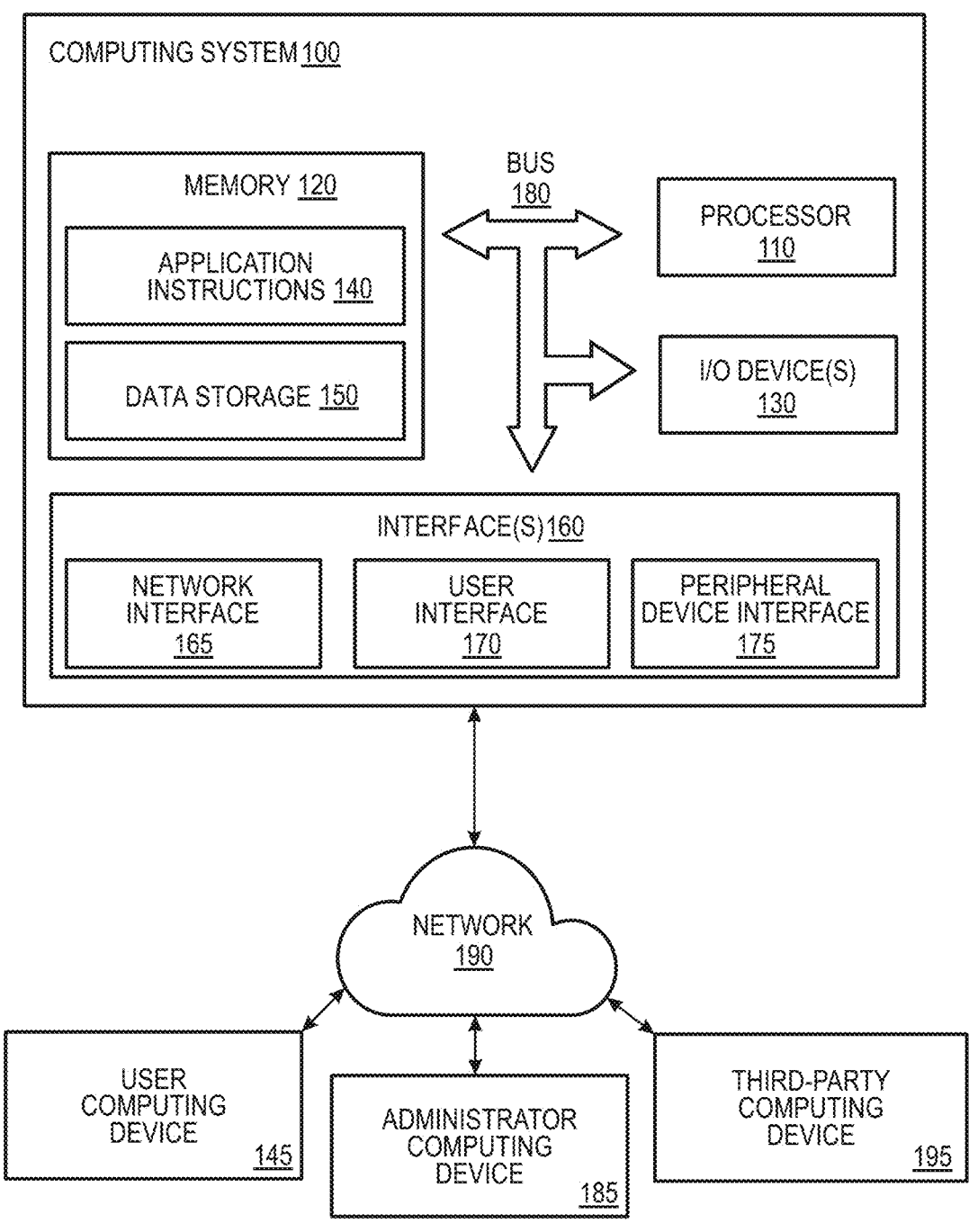
FIG. 1 illustrates a system architecture diagram, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed system may include at least one computing device in operable communication with a network and a server configured to host and execute an incident management platform. The incident management platform may include multiple functional modules, each implemented in software, firmware, hardware, or any combination thereof. In some embodiments, the modules may include a Situation Management Module configured to generate digital incident situations with unique identifiers and to assign administrative control to situation owners. A Geofencing Module may establish GPS-based geofences comprising adjustable center points and radii defining physical incident areas, enabling dynamic boundary adjustments as incidents evolve. An Access Control Module may receive access requests from responder users, validate credentials at multiple permission levels, and process approval or denial decisions from situation owners or administrators. A Resource Tracking Module may receive GPS location data from responder computing devices, compare GPS coordinates to geofence boundaries, and selectively display resource locations on map interfaces based on geofence position. A Communication Module may automatically generate general communication channels and create private encrypted communication channels based on security classification requirements. An Audit Module may generate comprehensive timestamped records documenting all system activities to create verifiable audit trails. A User Interface Module may provide interactive map rendering, situation creation interfaces, member profile displays, and communication channel interfaces accessible via mobile devices or web browsers. A Database Engine may manage structured incident data storage and retrieval operations for the Data Repository.

Conventional emergency incident management platforms often coordinate multi-agency response operations through radio communications and manual resource tracking, with limited ability to provide real-time visibility into responder locations, enforce geographic-based access control, or maintain automated audit trails without manual oversight. The disclosed embodiments address this problem by combining GPS-based geofencing with dynamic access control, real-time resource tracking, and multi-channel communications to actively coordinate emergency response operations and maintain situational awareness. This configuration enables automated, location-driven incident management that can dynamically control resource visibility based on geofence position, process multi-level access requests, and track mobilization status while maintaining complete audit trails.

In practice and in use, the system may be deployed by an emergency management organization that coordinates multi-agency response operations such as wildfire incidents, hazardous material responses, natural disasters, or active threat situations across multiple geographic areas. When a situation owner creates a digital incident situation, the Situation Management Module may establish incident parameters and activate geofencing capabilities defining the physical incident area. The Geofencing Module may establish GPS-based boundaries with adjustable center points and radii that can be modified as the incident evolves. When responder users request access to the incident, the Access Control Module may validate credentials and process approval decisions from the situation owner. The Resource Tracking Module may receive GPS location data from approved responders and selectively display resource positions on map interfaces when resources are within the geofence boundaries. The Communication Module may provide general communication channels for broad coordination and private encrypted channels for agency-specific or tactical communications. If incident boundaries change or access needs to be revoked, the system may dynamically update geofence parameters or process demobilization actions.

In this way, the system may improve incident coordination by automating geographic-based resource tracking, reducing reliance on radio-based status reporting, and providing real-time situational awareness through GPS integration. The geofencing functionality with selective display ensures that resource locations are visible to incident commanders when within the incident area while suppressing display when resources are outside operational boundaries. The multi-level access control prevents unauthorized participation in incident operations by embedding approval workflows directly into access request processing. The Audit Module preserves detailed operational records, as such, the system provides verifiable documentation of incident activities for after-action reviews and regulatory compliance. These capabilities can reduce coordination latency by automating resource tracking workflows, improve situational awareness by providing real-time GPS-based location visibility, and optimize resource management by tracking mobilization status, demobilization status, and shift-work rotation times for response teams.

Various implementations of the present disclosure involve the technical field of computer-based emergency incident management and response coordination systems for multi-agency operations, including executing algorithms to validate access credentials against multi-level permission requirements, integrating real-time GPS location data into geofence-based visibility decisions, applying rule-based logic to enforce access control and administrative permissions, generating dynamic situation records based on changing incident conditions and responder assignments. These operations are inherently computer-based and cannot be performed in the human mind or using pen and paper due to the volume, speed, and complexity of the data being processed. For example, the system executes the steps of receiving situation creation requests from network-connected devices, establishing GPS-based geofences with adjustable boundaries, receiving GPS location data from multiple responder computing devices, comparing GPS coordinates to geofence boundaries, selectively displaying or suppressing resource locations based on geofence position, and generating or denying access in real-time based on multi-level credential validation and situation owner approval decisions. The present disclosure amounts to more than merely implementing a generic computer as a tool to gather, analyze, and output data because the claimed operations improve the field of emergency incident management by enabling automated, GPS-driven coordination that actively maintains situational awareness and prevents unauthorized participation rather than merely documenting incident activities after the fact. In particular, the speed at which the steps of the present disclosure occur to effectuate the disclosed method, system, or product would involve real-time processing of GPS location data, instantaneous validation of access credentials across distributed systems, and immediate generation of geofence-based visibility decisions when responders cross incident boundaries. That is, the steps of the present method, system, or product are impossible to accomplish on pen and paper, cannot be accomplished as a method of organizing human activity, and amount to more than merely gathering, analyzing, and outputting data.

Various implementations of the present disclosure include executing computer-implemented geofencing algorithms, GPS data processing routines, and rule-based access control engines on computing hardware to coordinate emergency response operations in real-time incident environments or other public or private incident or situation management operations. The computing system implements these algorithms when it performs tasks such as comparing GPS coordinates to geofence center points and radii, parsing location data from multiple mobile computing devices, evaluating geofence boundary crossings, applying multi-level permission validation to access control decisions, and generating situation records or access denials based on integrated validation results. In particular, the speed at which the system processes real-time GPS location data from multiple responder computing devices, validates access credentials across multiple permission levels, and enforces geofence-based visibility decisions when resources cross incident boundaries would involve continuous, high-frequency data processing across networked systems. As such, the present disclosure would be impossible to accomplish on pen and paper or in the human mind due to the volume of real-time GPS location data being processed, the number of simultaneous geofence comparisons being performed, and the speed required to maintain situational awareness and coordinate multi-agency response operations.

In some embodiments, the Situation Management Module processes situation creation requests by generating digital incident situations with unique identifiers, assigning administrative control to situation owners, and activating geofencing and communication capabilities. The Geofencing Module executes coordinate comparison algorithms against GPS-based boundaries to determine when adjustments to center points or radii are needed as incidents evolve. The Access Control Module executes credential validation queries against pre-registered data at agency level and individual level, applies multi-level permission determination algorithms, and communicates validation results back to situation owners for approval decisions. The Resource Tracking Module receives streaming GPS location data from network-connected mobile computing devices, applies boundary comparison algorithms to evaluate whether resources are within or outside geofence boundaries, and generates selective display decisions when geofence positions change. The Communication Module applies channel generation logic that creates general channels automatically upon situation creation and creates private encrypted channels based on security classification requests. The foregoing operations are executed as sequences of GPS coordinate calculations, algorithmic comparisons, conditional logic evaluations, and network communications across distributed systems, and cannot practically be performed in the human mind or on paper. These concrete processing steps of real-time GPS data integration, automated access control validation, geofence-based visibility enforcement, and dynamic communication channel management provide a specific improvement to emergency incident management systems by enabling active coordination of multi-agency response operations through automated tracking mechanisms, rather than a mere abstract idea of organizing human activity.

In some embodiments, the Situation Management Module processes situation creation requests by generating digital incident situations with unique identifiers, assigning administrative control to situation owners, and activating geofencing and communication capabilities. The Geofencing Module executes coordinate comparison algorithms against GPS-based boundaries to determine when adjustments to center points or radii are needed as incidents evolve. The Access Control Module implements a three-tier access control list (ACL) architecture comprising role-based permissions, situation-based permissions, and channel-based permissions that operate in layered fashion to control system access and functionality. The role-based ACL tier assigns system-level user roles including XTLK_USER for general users, XTLK_ORG_ADMIN for organization administrators managing agency-specific settings, XTLK_ADMIN for system administrators employed by the platform provider, and XTLK_SUPER_ADMIN for super administrators with extended capabilities beyond standard system administrators. The situation-based ACL tier controls access to digital incident situations through situation member status enumeration values of REQUESTED when users submit access requests, APPROVED when situation owners or administrators authorize access, ACTIVE when users either are manually marked active by administrators or automatically transition from APPROVED to ACTIVE upon crossing GPS-based geofence boundaries, DENIED when access requests are rejected, OFF_DUTY when users are temporarily unavailable, and REMOVED when users are disassociated from situations. The situation-based ACL tier also assigns member role enumeration values of OWNER for situation creators with full administrative control, ADMIN for designated administrators with elevated permissions, and USER for standard participants. The channel-based ACL tier controls access to communication channels through channel member status enumeration values of REQUESTED, ACTIVE, DENIED, and REMOVED, with member role values of OWNER, ADMIN, and USER mirroring the situation-based structure. The channel-based permissions are layered upon situation-based permissions such that users must satisfy situation member requirements before channel member requirements can be evaluated, ensuring that only approved situation participants can access situation-related communication channels. The Access Control Module may also implement soft-deletion mechanisms where users, organizations, situations, and channels can be marked as archived rather than permanently deleted, with archived status affecting access policy evaluations to prevent interaction with deactivated entities. The Resource Tracking Module receives streaming GPS location data from network-connected mobile computing devices, applies boundary comparison algorithms to evaluate whether resources are within or outside geofence boundaries, and generates selective display decisions when geofence positions change. The Communication Module applies channel generation logic that creates general channels automatically upon situation creation and creates private encrypted channels based on channel type requests. The foregoing operations are executed as sequences of GPS coordinate calculations, algorithmic comparisons, conditional logic evaluations, enumeration state transitions, and network communications across distributed systems, and cannot practically be performed in the human mind or on paper. These concrete processing steps of real-time GPS data integration, automated multi-tier access control validation with status enumeration management, geofence-based visibility enforcement with automatic APPROVED-to-ACTIVE transitions upon boundary crossings, and dynamic communication channel management provide a specific improvement to emergency incident management systems by enabling active coordination of multi-agency response operations through automated tracking mechanisms, rather than a mere abstract idea of organizing human activity.

The disclosed incident management platform incorporates several technical features that distinguish it from conventional emergency coordination systems. In some embodiments, the platform may implement GPS-based geofencing with dynamic adjustment capabilities that establish geographic boundaries comprising adjustable center points and radii defining physical incident areas. The geofence boundaries may be modified in real-time as incident scope evolves, enabling situation owners to adjust center point coordinates or radius dimensions without requiring system reconfiguration. The Geofencing Module may prevent resource visibility outside designated incident areas, ensuring that GPS locations are displayed on map interfaces only when responder resources are within geofence boundaries, while automatically suppressing display when resources move outside the defined perimeter.

In some embodiments, the platform may implement multi-level access control with situation owner approval workflows that validate credentials at multiple permission levels before granting access to incident operations. Unlike conventional systems that maintain personnel rosters in separate databases without operational integration, the disclosed platform may integrate credential validation directly into access request workflows at situation-level, agency-level, team-level, and individual-level. When the Access Control Module receives an access request from a responder user, the system may validate user credentials against pre-registered data and query the situation owner or administrator for approval decision. This embedded validation ensures that access control is not merely tracked but actively enforced at the point of request, preventing situations where unauthorized personnel gain access to incident operations without proper credentials or situation owner approval.

In some embodiments, the platform may implement selective resource visibility based on geofence position that displays GPS locations on map interfaces only when resources are within incident boundaries. The Resource Tracking Module may continuously compare GPS coordinates received from responder computing devices to geofence boundaries and may automatically suppress display when resources move outside the defined incident area. When incident boundaries are adjusted through center point or radius modifications, the system may immediately re-evaluate all resource positions and may update display visibility accordingly. This geofence-driven visibility control ensures that incident commanders maintain accurate situational awareness of resources actively deployed within the incident area while avoiding clutter from resources that have demobilized or are staged outside operational boundaries.

In some embodiments, the platform may implement automated mobilization and demobilization tracking that records entry timestamps and exit timestamps for geofence boundary crossings. Unlike conventional systems that may require manual status reporting when responders arrive at or depart from incident scenes, the disclosed platform may automatically detect when resources cross geofence boundaries based on GPS coordinate comparisons. The Resource Tracking Module may log movement data and personnel assignment periods to the Audit Module, creating timestamped records of when each resource entered the incident area, how long they remained within operational boundaries, and when they departed. This automated tracking enables monitoring of shift-work rotation times for long-duration incidents, ensuring that responder fatigue is managed and that personnel deployment durations are documented for after-action analysis.

In some embodiments, the platform may implement multi-channel communications with automatic general channel generation and on-request private encrypted channels. The Communication Module may automatically generate a general communication channel upon digital incident situation creation, providing immediate coordination capability accessible to all approved users without requiring manual channel setup. When situation owners or administrators require agency-specific or tactical communications, the Communication Module may create private encrypted channels with access restricted based on security classification requirements. This multi-tier communication architecture enables broad coordination through general channels while supporting confidential communications for law enforcement operations, medical information, or command-level tactical discussions that require restricted access.

In some embodiments, the platform may implement comprehensive audit trails with timestamped logging of all system activities. The Audit Module may record not only what actions were taken but also when actions occurred, who initiated them, and what system state existed at the time of action. Each logged record may include situation identifiers, user identifiers, assigned roles and permissions, GPS location data, geofence boundary parameters, access request outcomes, approval decisions, mobilization events, demobilization events, communication channel activities, and precise timestamps. This comprehensive documentation may ensure that incident activities are verifiable through complete audit records and may provide defensible documentation for after-action reviews, regulatory compliance reporting, and legal proceedings that may follow major incidents.

In some embodiments, the platform may incorporate team organization capabilities that support assignment of users to response teams or individual roles based on operational units. The Access Control Module may process team-level permissions that enable entire teams to be approved or denied access collectively, while still maintaining individual-level credential validation for each team member. When team assignments change during incident operations, such as when personnel are reassigned between operational units or when shift changes occur, the system may track these organizational modifications and may log them to audit records. This team-based organization enables incident commanders to structure response operations using established organizational frameworks such as Incident Command System (ICS) principles while maintaining accountability for individual responder actions.

In some embodiments, the platform may implement integration with Federal Emergency Management Agency (FEMA) National Incident Management System (NIMS) standards by formatting and transmitting incident data to external emergency response systems for compliance reporting. The Database Engine may synchronize situation records, resource deployment data, and audit trail information with external emergency response systems via the network, ensuring that incident information is available to regional or national coordination centers without requiring manual data entry. In some embodiments, the synchronization may occur in real-time as incidents evolve, enabling multi-jurisdictional visibility into ongoing operations and supporting resource requests that require approval from external agencies or government entities.

The integration with GPS-enabled mobile computing devices may represent a departure from conventional incident management systems that rely on radio-based status reporting. In some embodiments, the Resource Tracking Module may receive GPS location data continuously from responder computing devices such as smartphones or tablets, eliminating manual position reporting where personnel verbally communicate their locations through radio channels. The system may process streaming GPS coordinate updates and may compare each position update to current geofence boundaries to determine display visibility. By establishing direct data connections with mobile computing devices, the platform may ensure that resource tracking reflects current positions rather than potentially outdated or inaccurately reported locations from manual status reports.

The embedded access control functionality ensures that situation owner approval is enforced at the point of request rather than merely tracked in separate personnel databases. In some embodiments, the Access Control Module may integrate multi-level permission validation with approval workflows that require explicit authorization from situation owners or administrators before granting access to incident operations. The system may prevent unauthorized participation by embedding approval checkpoints into access request processing, making situation owner approval an operational prerequisite rather than an administrative data point reviewed periodically during incident briefings. This embedded enforcement may address a common failure mode in conventional systems where unauthorized personnel participate in incident operations because access control decisions are not integrated into operational coordination workflows.

These technical features may collectively transform emergency incident management from a radio-based coordination process into an automated tracking and access control system. Whereas conventional systems may rely on manual position reporting and verbal access authorization through dispatcher communications, the disclosed platform may coordinate response operations through automated GPS-based tracking mechanisms that maintain real-time situational awareness and enforce access control through multi-level validation workflows. By integrating geofencing, access control, resource tracking, communication channels, and audit logging into a unified incident management platform with GPS-driven visibility decisions and approval-gated access, the system may address fundamental limitations in current emergency coordination approaches that separate situational awareness activities from access control mechanisms.

FIG. 1 illustrates an example of a computing system 100 that may provide the execution environment for implementing the processes and methods described herein. The computing system 100 may take various forms depending on deployment context, including but not limited to: a desktop or laptop computer, a tablet or smartphone, a server in a data center, a network appliance, a mainframe computer, a workstation, or a cloud-hosted virtual machine. In some embodiments, the computing system 100 may correspond to a distributed computing environment, such as a cluster of servers executing containerized workloads (e.g., Docker, Kubernetes), or an edge device integrated into Internet of Things (IoT) environments. In other embodiments, the computing system 100 may be embedded in another device, such as a vehicle infotainment unit, a medical diagnostic machine, an industrial robot controller, or a wearable computing device.

The computing system 100 includes one or more processors 110 operably coupled to a memory 120 via a system bus 180. The processor 110 may be implemented as a general-purpose central processing unit (CPU), a graphics processing unit (GPU), a tensor processing unit (TPU), a digital signal processor (DSP), or any combination thereof. In some embodiments, the processor 110 may be an application-specific integrated circuit (ASIC) optimized for a particular workload, a field-programmable gate array (FPGA), or a quantum or neuromorphic processor in advanced implementations. The processor 110 may include single-core, multi-core, or many-core configurations and may support hardware virtualization, multithreading, or parallel execution environments to optimize system performance. In some implementations, the computing system 100 is deployed using standard application development frameworks, predominantly open source software components, and cloud computing infrastructure resources that provide scalable processing, memory, and storage capabilities without requiring specialized hardware configurations.

The memory 120 may include volatile memory, nonvolatile memory, or a combination thereof. Volatile memory may include system RAM, cache memory, or high-bandwidth memory (HBM). Nonvolatile memory may include flash storage, solid-state drives (SSD), magnetic hard disk drives (HDD), optical storage devices, or persistent memory technologies such as Intel Optane. The memory 120 stores application instructions 140 for carrying out the functionalities described herein and data storage 150 for maintaining information related to system operations. The application instructions 140 may include code written in languages such as C, C++, Java, Python, Go, Rust, or JavaScript, as well as machine learning models trained using frameworks such as TensorFlow or PyTorch. The data storage 150 may contain structured information such as relational database records, unstructured data such as text or images, or real-time telemetry streams. In cloud-based embodiments, the memory 120 may represent scalable storage resources provisioned on-demand through Infrastructure-as-a-Service (IaaS) providers.

The computing system 100 may also include one or more input/output (I/O) devices 130. These devices may encompass visual output devices such as monitors, head-mounted displays, augmented reality (AR) glasses, or projectors; input devices such as keyboards, mice, touchscreens, styluses, or game controllers; and sensor devices such as microphones, cameras, depth sensors, biometric scanners, or environmental sensors. In industrial or medical environments, the I/O devices 130 may include robotic actuators, infusion pumps, or diagnostic imaging scanners. In vehicular environments, the I/O devices 130 may include in-cabin displays, steering sensors, and connected infotainment systems.

The computing system 100 further comprises one or more interfaces 160 that enable communication with other systems, users, or peripheral components. The network interface 165 enables the computing system 100 to exchange data with external systems across a network 190 using wired or wireless protocols. Example communication standards include Ethernet, Wi-Fi, Bluetooth, 5G, Long-Term Evolution (LTE), satellite communication, or emerging protocols such as Wi-Fi 7 or ultra-wideband (UWB). In some embodiments, the network interface 165 supports secure protocols such as HTTPS, TLS, or VPN tunneling to ensure authenticated and encrypted data transfer. The user interface 170 may include APIs, graphical user interfaces (GUIs), command-line interfaces (CLIs), or natural language interfaces enabled through speech recognition or chatbot systems. The peripheral device interface 175 enables connectivity with external hardware such as printers, external storage arrays, or specialized scientific equipment.

The network 190 represents any communication infrastructure capable of facilitating data exchange between computing entities. In some embodiments, the network 190 corresponds to a local area network (LAN) within a home or enterprise environment. In other embodiments, the network 190 may be a wide area network (WAN), a metropolitan area network (MAN), a peer-to-peer (P2P) communication mesh, or the global Internet. The network 190 may employ cloud orchestration layers, software-defined networking (SDN), or edge computing gateways. In high-security applications, the network 190 may implement firewalls, intrusion detection systems, or zero-trust architectures to protect transmitted data.

The computing system 100 is illustrated as being in communication with multiple external devices, including a user computing device 145, an administrator computing device 185, and a third-party computing device 195. The user computing device 145 may be a smartphone, tablet, laptop, or smart appliance configured to execute client-side applications or interact with system services. The administrator computing device 185 may be a workstation or remote management console configured to perform oversight functions such as monitoring, auditing, updating, or troubleshooting. The third-party computing device 195 may represent a partner system, vendor service, or external application interface that exchanges data with the computing system 100 via secure APIs. In cloud or SaaS embodiments, these devices may also include external microservices, data warehouses, or federated learning nodes.

In some embodiments, the computing system 100 may be deployed in a client-server model, where the computing system 100 acts as a backend server managing requests from client devices. In other embodiments, the computing system 100 may function within a cloud-native environment, operating as a microservice within a container orchestration platform. In edge deployments, the computing system 100 may be optimized for low-latency local processing, while synchronizing with centralized cloud infrastructure for data persistence and global coordination.

Figure 2:
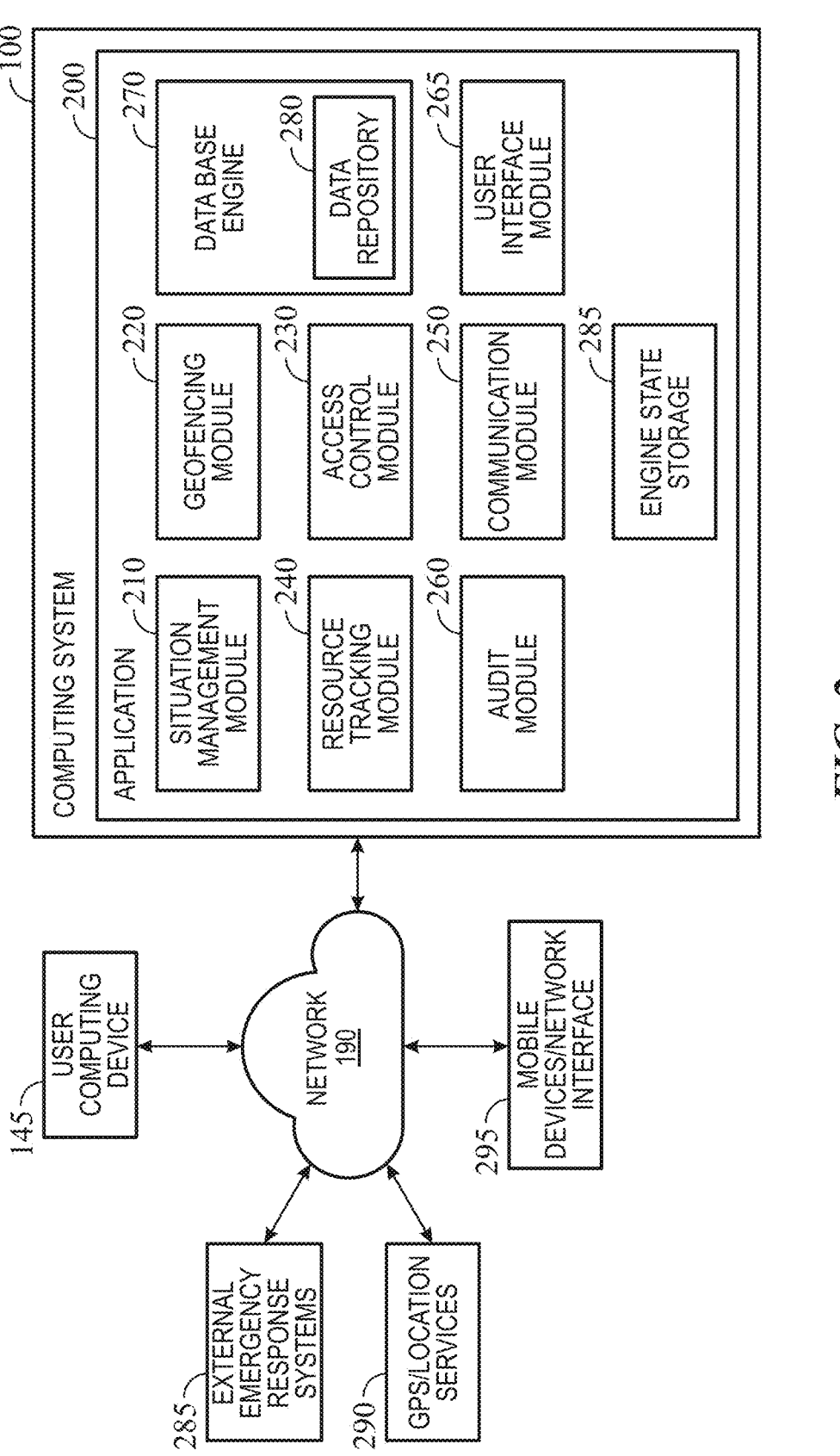
FIG. 2 illustrates an application program and modules in communication with the computing system, according to some embodiments.

FIG. 2 illustrates an example computer architecture for the application program 200 operated via the computing system 100. The computing system 100 comprises several modules and engines configured to execute the functionalities of the application program 200, and a database engine 270 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 is configured for emergency incident management and response coordination in multi-agency operations. The application program 200 may comprise a Situation Management Module 210, a Geofencing Module 220, an Access Control Module 230, a Resource Tracking Module 240, a Communication Module 250, an Audit Module 260, and a User Interface Module 265. The application program 200 further interfaces with a Database Engine 270 that manages operations for the Data Repository 280. The computing system 100 communicates via network 190 with external systems including user computing devices 145, External Emergency Response Systems 285, and GPS/Location Services 290.

In some embodiments, the Situation Management Module 210 may be configured to control the creation and administration of digital incident situations by receiving situation creation requests from situation owners and generating unique incident identifiers. The Situation Management Module 210 may receive situation creation requests from situation owners via the User Interface Module 265 and may extract incident parameters such as incident name, incident type, and incident location from the received requests. The Situation Management Module 210 may generate a digital incident situation with a unique identifier that distinguishes each incident from other concurrent operations and may assign administrative control to the situation owner who initiated the creation request.

In some embodiments, the Situation Management Module 210 may initialize incident parameters by storing incident name, incident type, and incident location in the Data Repository 280 via the Database Engine 270. The Situation Management Module 210 may activate the Geofencing Module 220 by transmitting a geofence initialization request containing the incident location coordinates. The Situation Management Module 210 may direct the Communication Module 250 to create a general communication channel automatically upon situation creation, enabling immediate coordination capability for the incident. The Situation Management Module 210 may store situation records in the Data Repository 280, where records may include situation identifiers, situation owner identifiers, incident parameters, creation timestamps, and administrative permission settings. This automated situation establishment may reduce the time required to initiate incident coordination compared to manual setup processes that require sequential configuration of multiple system components.

In some embodiments, the Geofencing Module 220 may be configured to establish and maintain GPS-based geographic boundaries that define physical incident areas. The Geofencing Module 220 may receive geofence initialization requests from the Situation Management Module 210 containing incident location coordinates. The Geofencing Module 220 may define a center point at the incident location by extracting latitude and longitude coordinates from the initialization request. In some embodiments, the Geofencing Module 220 may set an initial radius defining the physical incident area, where the radius may be specified in the initialization request or may be determined based on incident type retrieved from the Data Repository 280 via the Database Engine 270.

In some embodiments, the Geofencing Module 220 may monitor incident evolution and boundary requirements by receiving adjustment requests from situation owners via the User Interface Module 265. When incident scope changes due to fire spread, evacuation zone expansion, or operational perimeter modifications, the Geofencing Module 220 may receive updated center point coordinates or updated radius values. The Geofencing Module 220 may update geofence parameters in real-time by modifying the stored center point coordinates or radius values in the Data Repository 280. The Geofencing Module 220 may transmit updated geofence boundaries to the Resource Tracking Module 240, enabling immediate re-evaluation of which responder resources are within or outside the modified incident area. This dynamic adjustment capability may enable incident commanders to adapt geographic boundaries as incidents evolve without requiring system reconfiguration or manual notification to all responding agencies.

In some embodiments, the Access Control Module 230 may be configured to process access requests from responder users and enforce multi-level permission validation before granting access to digital incident situations. The Access Control Module 230 may receive access requests from responder users via the User Interface Module 265, where access requests may include user identifiers, agency affiliations, and requested incident identifiers. The Access Control Module 230 may validate user credentials against pre-registered data stored in the Data Repository 280 by executing database queries via the Database Engine 270. In some embodiments, the validation process may occur at agency level and individual level, verifying that requesting users are associated with authorized response agencies and that individual credentials are current and valid.

In some embodiments, the Access Control Module 230 may determine multi-level access permissions by evaluating situation-level permissions that control overall incident access, agency-level permissions that define which agencies may participate, team-level permissions that specify which operational units are authorized, and individual-level permissions that validate specific responder credentials. The Access Control Module 230 may assign users to response teams or individual roles based on operational unit assignments specified in access requests or determined from pre-configured organizational structures stored in the Data Repository 280. The Access Control Module 230 may query the situation owner or administrator for approval decisions by transmitting access request notifications via the User Interface Module 265.

In some embodiments, the Access Control Module 230 may receive approval or denial decisions from situation owners or administrators through the User Interface Module 265. When approval is received, the Access Control Module 230 may grant access by storing approved user associations with the digital incident situation in the Data Repository 280 and may assign permissions defining which system functions the user may access. When denial is received, the Access Control Module 230 may log the rejection to the Audit Module 260 with rationale provided by the situation owner or administrator. The Access Control Module 230 may transmit access results to user computing devices 145 via the User Interface Module 265 and the Network 190, informing responders whether their access requests were approved or denied. This approval-gated access control may prevent unauthorized personnel from participating in incident operations regardless of their agency affiliations or credentials.

In some embodiments, the Resource Tracking Module 240 may be configured to monitor GPS locations of responder resources and selectively display position data based on geofence boundaries. The Resource Tracking Module 240 may receive GPS location data from responder resources by establishing communication connections with user computing devices 145 via the Network 190. In some embodiments, user computing devices 145 may be smartphones or tablets carried by responders that continuously transmit GPS coordinates obtained from GPS/Location Services 290. The Resource Tracking Module 240 may parse received location data to extract latitude coordinates, longitude coordinates, altitude data, and location timestamps for each responder resource.

In some embodiments, the Resource Tracking Module 240 may compare GPS coordinates to geofence boundaries by retrieving current center point coordinates and radius values from the Geofencing Module 220. The Resource Tracking Module 240 may calculate the distance between each responder's GPS coordinates and the geofence center point using coordinate geometry algorithms. When the calculated distance is less than or equal to the geofence radius, the Resource Tracking Module 240 may determine that the responder resource is within the geofence boundaries. When the calculated distance exceeds the geofence radius, the Resource Tracking Module 240 may determine that the responder resource is outside the geofence boundaries.

In some embodiments, the Resource Tracking Module 240 may display GPS locations on a map interface when responder resources are within the geofence boundaries by transmitting position data to the User Interface Module 265 for rendering on map displays. The Resource Tracking Module 240 may suppress display of GPS locations when responder resources are outside the geofence boundaries by withholding position data from the User Interface Module 265. This selective display functionality may ensure that incident commanders maintain visibility of resources actively deployed within the incident area while avoiding map clutter from resources that have departed or are staged outside operational boundaries.

In some embodiments, the Resource Tracking Module 240 may record entry timestamps when responder resources cross from outside to inside the geofence boundaries and may record exit timestamps when resources cross from inside to outside the boundaries. The Resource Tracking Module 240 may track mobilization status by monitoring which approved responders have entered the incident area and may track demobilization status by monitoring which responders have departed the incident area. In some embodiments, the Resource Tracking Module 240 may monitor shift-work rotation times for long-duration incidents by calculating elapsed time between entry timestamps and current time or exit timestamps. The Resource Tracking Module 240 may log movement data and personnel assignment periods to the Audit Module 260, creating comprehensive records of responder deployment throughout incident lifecycles.

In some embodiments, the Communication Module 250 may be configured to establish and manage communication channels that enable coordination among approved responders. All communication channels implement Transport Layer Security (TLS) encryption for data transmission across the Network 190 and rely on operating system-level file system encryption for data at rest in the Data Repository 280, ensuring that communication data is protected during transit and storage regardless of channel type. Access to communication data is controlled through the channel-based access control list architecture, where user permissions depend on channel type selection and user associations with the digital incident situation or specific communication channels as validated by the Access Control Module 230. The Communication Module 250 may receive notification of digital incident situation creation from the Situation Management Module 210. Upon receiving situation creation notification, the Communication Module 250 may automatically generate a general communication channel associated with the digital incident situation. In some embodiments, the general communication channel may be configured for communications accessible to all approved users who have been granted access to the digital incident situation by the Access Control Module 230.

In some embodiments, the Communication Module 250 may receive requests for private communication channels from situation owners or administrators via the User Interface Module 265. The requests may specify security classification requirements, participant restrictions, or agency-specific communication needs. The Communication Module 250 may create private channels with encrypted data transmission by establishing secure communication connections and assigning encryption keys to authorized participants. The Communication Module 250 may assign channel access based on security classification requirements by evaluating user permissions stored in the Data Repository 280 and limiting channel visibility and participation to users meeting specified criteria. In some embodiments, the Communication Module 250 may enable multimedia communication capabilities for all channels, supporting text messages, voice communications, image sharing, and document attachments to facilitate comprehensive operational coordination.

In some embodiments, the Audit Module 260 may be configured to generate comprehensive records documenting all system activities throughout incident lifecycles. The Audit Module 260 may receive logging requests from the Situation Management Module 210, Geofencing Module 220, Access Control Module 230, Resource Tracking Module 240, and Communication Module 250 as these components execute their respective functions. In some embodiments, the Audit Module 260 may generate timestamped records that associate each logged activity with a specific date and time of occurrence using high-precision timestamps obtained from the computing system 100.

In some embodiments, the records may include situation identifiers linking activities to specific digital incident situations, user identifiers documenting which users performed actions, assigned roles and permissions at the time of action, GPS location data documenting responder positions, geofence boundary parameters documenting incident area definitions, access request outcomes documenting approval or denial decisions, mobilization events documenting when responders entered incident areas, demobilization events documenting when responders departed incident areas, communication channel activities documenting message exchanges and channel creations, and precise timestamps enabling chronological reconstruction of incident progression. The Audit Module 260 may store generated records in the Data Repository 280 via the Database Engine 270 in a structured format that enables subsequent retrieval and analysis. In some embodiments, the Audit Module 260 may implement tamper-evident logging mechanisms that prevent modification or deletion of stored audit records, enabling the records to serve as verifiable documentation for after-action reviews, regulatory compliance reporting, and legal proceedings.

In some embodiments, the User Interface Module 265 may be configured to facilitate interactions between users and the incident management platform by generating and transmitting user interfaces to user computing devices 145. The User Interface Module 265 may generate interactive map rendering displays that visualize geofence boundaries received from the Geofencing Module 220 and responder GPS positions received from the Resource Tracking Module 240. In some embodiments, the User Interface Module 265 may provide situation creation and editing interfaces enabling situation owners to establish new digital incident situations, modify incident parameters, adjust geofence center points and radii, and manage administrative settings.

In some embodiments, the User Interface Module 265 may provide member profile displays showing responder information, organizational affiliations, assigned roles, and current deployment status. The User Interface Module 265 may provide communication channel interfaces enabling users to view available channels, send messages, and participate in voice communications through general and private encrypted channels managed by the Communication Module 250. The User Interface Module 265 may display real-time GPS position updates on map interfaces by continuously refreshing position data received from the Resource Tracking Module 240 at regular intervals. In some embodiments, the User Interface Module 265 may support mobile computing device access by generating responsive interfaces optimized for smartphone and tablet displays, enabling field personnel to interact with the incident management platform from operational locations without requiring fixed workstations.

In some embodiments, the Database Engine 270 may be configured to manage data storage and retrieval operations for the Data Repository 280. The Database Engine 270 may execute database queries submitted by other components of the application program 200, maintain indexes that enable efficient data retrieval, and ensure data integrity by enforcing constraints on stored data. In some embodiments, the Database Engine 270 may manage storage of situation records, geofence parameters, access control permissions, GPS location data, audit logs, and communication channel configurations in the Data Repository 280. The Database Engine 270 may support concurrent access by multiple components, enabling the Situation Management Module 210, Geofencing Module 220, Access Control Module 230, Resource Tracking Module 240, Communication Module 250, and Audit Module 260 to read and write data simultaneously without conflicts.

In some embodiments, the Database Engine 270 may synchronize data with External Emergency Response Systems 285 via the Network 190 by transmitting situation records, resource deployment data, and audit trail information to external systems. This synchronization may enable organizations to maintain consistent incident records across multiple platforms without requiring manual data entry in multiple systems. In some embodiments, the computing system 100 may be implemented as a cloud-based server configured to synchronize incident data across a plurality of geographic locations, enabling centralized incident coordination and compliance tracking for organizations operating multiple distributed emergency operations centers.

In some embodiments, the Database Engine 270 may be configured to format incident data to enable compliance with Federal Emergency Management Agency (FEMA) reporting requirements and National Incident Management System (NIMS) standards. The Database Engine 270 may execute data compilation algorithms that extract situation records, GPS location data, entry timestamps, exit timestamps, mobilization status, demobilization status, and audit logs from the Data Repository 280 and may transform this operational data into standardized FEMA Incident Command System (ICS) forms. The Database Engine 270 may generate ICS-201 Incident Briefing forms by compiling the unique identifier, incident name, incident type, incident location, adjustable center point coordinates, adjustable radius values, and situation owner identifier along with incident objectives and organizational assignments. The Database Engine 270 may generate ICS-214 Unit Log forms by extracting deployment tracking records for each responding agency and operational unit, documenting personnel assignments, entry timestamps, exit timestamps, deployment durations, and activity descriptions for each responder resource. The Database Engine 270 may generate ICS-215 Operational Planning Worksheets by compiling GPS location data, team assignments documented by the Access Control Module 230, and equipment deployments tracked by the Resource Tracking Module 240.

In some embodiments, the Database Engine 270 may calculate personnel costs for FEMA reimbursement documentation by processing deployment duration data. The Database Engine 270 may retrieve entry timestamps and exit timestamps from deployment tracking records and may calculate elapsed time between these timestamps to determine total deployment hours for each responder. The Database Engine 270 may query personnel cost configuration tables containing pay rate data including regular hourly rates, overtime multipliers, emergency pay premiums, hazard pay rates, and per diem allowances for different responder roles and agencies. The Database Engine 270 may multiply calculated deployment hours by applicable pay rates to generate personnel cost values for individual responders. The Database Engine 270 may aggregate individual personnel costs across all deployed responders to generate total personnel expense summaries organized by agency, role, and operational period.

In some embodiments, the Database Engine 270 may track equipment usage costs by monitoring specialized resource deployments documented through GPS-based geofence boundary crossings. When helicopter resources, mobile command posts, heavy equipment, or other high-value assets enter the GPS-based geofence at recorded entry timestamps and depart at exit timestamps, the Database Engine 270 may calculate equipment deployment hours and may apply configured hourly rates such as helicopter operations rates, heavy equipment rates, or specialized vehicle rates to determine equipment costs. The Database Engine 270 may compile personnel costs and equipment costs into FEMA Public Assistance reimbursement forms documenting total incident expenses eligible for federal cost recovery. For incidents occurring during presidentially declared disasters or emergencies, the generated reimbursement documentation may support applications for FEMA Public Assistance funding covering 75% or more of eligible emergency response expenses.

In some embodiments, the Database Engine 270 may format situation records, GPS location data, and audit logs according to NIMS data exchange specifications using standardized XML schemas, data field definitions, and reporting protocols that ensure interoperability with federal emergency management information systems. The Database Engine 270 may structure transmitted data to include situation identifiers, incident classifications, geographic coordinates defining adjustable center point and adjustable radius for GPS-based geofences, resource deployment records with entry timestamps and exit timestamps, access control decisions documenting multi-level permission validations at situation-level, agency-level, team-level, and individual-level, and comprehensive audit trails with precise timestamps enabling chronological reconstruction of incident activities. The NIMS-compliant formatting enables External Emergency Response Systems 285 including FEMA servers and regional coordination centers to ingest and process incident data automatically without requiring manual data reformatting or re-entry by emergency management personnel.

In some embodiments, the reimbursement documentation generated by the Database Engine 270 may include supporting evidence linking claimed costs to specific deployment periods through timestamped audit records. When FEMA auditors review reimbursement applications, they may access deployment tracking records showing exactly when each responder entered the physical incident area through GPS-based geofence boundary crossing, how long they remained deployed based on entry timestamp and exit timestamp differences, what roles they performed based on team assignments and individual-level permissions, and what pay rates were applied based on agency policies and emergency pay regulations. The comprehensive, tamper-evident audit trails maintained by the Audit Module 260 provide defensible documentation that personnel costs and equipment costs claimed for reimbursement correspond to actual resource deployments rather than estimated or inflated expense figures. This detailed cost documentation enables emergency response agencies to maximize cost recovery through FEMA Public Assistance programs by satisfying federal audit requirements for reimbursement approval.

In some embodiments, the Data Repository 280 may store structured incident data used by the application program 200. The Data Repository 280 may contain situation records including unique identifiers, incident names, incident types, incident locations, situation owner identifiers, creation time-stamps, and administrative permission settings. The Data Repository 280 may contain geofence parameters including center point coordinates, radius values, adjustment time-stamps, and geofence modification histories. The Data Repository 280 may contain access control data including user identifiers, agency affiliations, credential validation results, approval decisions, assigned roles, and permission levels. The Data Repository 280 may contain GPS location records including latitude coordinates, longitude coordi-nates, altitude data, location timestamps, geofence boundary crossing events, and position history trails. The Data Repository 280 may contain audit logs including comprehensive timestamped records of all system activities. In some embodiments, the Data Repository 280 may be implemented as a relational database, a NoSQL database, or a distributed storage system depending on system requirements and data volumes.

In some embodiments, the Network 190 may be a public or private data network, such as the Internet or a corporate intranet, enabling communication between the computing system 100, user computing devices 145, External Emer-gency Response Systems 285, and GPS/Location Services 290. The Network 190 may utilize standard communication protocols such as Transmission Control Protocol/Internet Protocol (TCP/IP), Hypertext Transfer Protocol Secure (HTTPS), or other network protocols to facilitate data trans-mission between connected systems. In some embodiments, the Network 190 may support both wired and wireless connections, enabling user computing devices 145 to trans-mit GPS location data from remote incident locations and enabling responders to access the incident management platform from field locations without requiring fixed net-work infrastructure.

User computing devices 145 may be mobile devices such as smartphones or tablets, portable computing devices such as laptops, or fixed workstations such as desktop computers. In some embodiments, user computing devices 145 may execute web browsers or dedicated mobile applications that interface with the User Interface Module 265 to display map interfaces, situation information, and communication chan-nels. Users may interact with user computing devices 145 to submit situation creation requests, request access to digital incident situations, view assigned roles and permissions, monitor responder locations, send communications, and receive notifications of system activities. The user comput-ing devices 145 may communicate with the computing system 100 via the Network 190 using encrypted connec-tions to maintain data security during transmission of opera-tional information. In some embodiments, user computing devices 145 may include GPS receivers that obtain location data from GPS/Location Services 290 and may continuously transmit GPS coordinates to the Resource Tracking Module 240, enabling automated position tracking without requiring manual status reporting.

External Emergency Response Systems 285 may be Fed-eral Emergency Management Agency (FEMA) servers, National Incident Management System (NIMS) databases, regional coordination centers, or emergency operations cen-ter platforms used by government agencies to track multi-jurisdictional incident activities. In some embodiments, External Emergency Response Systems 285 may be com-mercially available emergency management software, inci-dent tracking platforms, or custom government systems. The Database Engine 270 may format and transmit incident data to External Emergency Response Systems 285 via the Net-work 190 to ensure compliance with regulatory reporting requirements and to enable multi-jurisdictional visibility into ongoing operations. In some embodiments, the synchro-nization may occur in real-time as incidents evolve, or may be performed periodically in batch updates depending on system requirements and network capabilities. This data integration enables emergency management officials to access incident records and resource deployment informa-tion through their existing government systems without requiring direct access to the incident management platform.

GPS/Location Services 290 may be Global Positioning System satellites, cellular tower triangulation services, or other positioning technologies that provide location data to user computing devices 145. In some embodiments, GPS/Location Services 290 may transmit signals that enable user computing devices 145 to calculate precise latitude and longitude coordinates. The user computing devices 145 may receive GPS signals from GPS/Location Services 290 and may process the signals to determine current position data. This position data may then be transmitted to the Resource Tracking Module 240 via the Network 190 for geofence comparison and selective display determination. The inte-gration between GPS/Location Services 290 and the incident management platform may enable continuous automated position tracking that eliminates the need for responders to manually report their locations through radio communica-tions.

FIG. 3 is a flow diagram illustrating an exemplary opera-tional sequence of the Situation Management Module 210 in accordance with certain embodiments. The sequence shown may be implemented as computer-executable instructions within the application program 200 operating on computing system 100 of FIG. 2, with specific operations performed by the modules depicted therein.

At step 310, a situation creation request is received from a situation owner. This operation may be performed by the Situation Management Module 210 in coordination with the User Interface Module 265 of FIG. 2. In some embodiments, the User Interface Module 265 may render a situation creation form on user computing devices 145 comprising input fields for incident name, incident type selection from predefined categories, incident location specification through map interface interaction or address entry, and geofence radius selection. When the situation owner submits the completed form, the user computing device 145 may generate an HTTP POST request or REST API call containing form data serialized in JavaScript Object Notation (JSON) format or Extensible Markup Language (XML) format.

In some embodiments, the User Interface Module 265 may parse the received HTTP request by extracting the request body containing the serialized form data. The parsing operation may involve deserializing JSON strings into structured data objects or parsing XML elements into attribute-value pairs. The User Interface Module 265 may extract specific parameters including an incident name string, an incident type identifier corresponding to pre-defined incident categories stored in the Data Repository 280, geographic coordinates comprising latitude and longitude decimal values obtained from map interface selections, and a radius value specified in miles or kilometers. In some embodiments, the extracted parameters may be validated to ensure required fields are populated, geographic coordinates fall within valid ranges, and radius values meet minimum and maximum constraints configured in system settings.

In some embodiments, the User Interface Module 265 may transmit the extracted parameters to the Situation Management Module 210 through an inter-process communication mechanism such as a message queue, function call with parameter passing, or internal API invocation. The transmitted data may include a situation owner identifier obtained from the authenticated user session, enabling the Situation Management Module 210 to associate the digital incident situation with the creating user. For example, when a fire chief creates a wildfire evacuation situation, the situation owner identifier may reference the fire chief's user account record, while the incident name may be "Wildland Fire Evac. near Camp Bullis," the incident type may be categorized as "wildfire," the incident location coordinates may correspond to Camp Bullis, Texas, and the geofence radius may be specified as 4 miles.

At step 320, a digital incident situation with a unique identifier is generated. This operation is performed by the Situation Management Module 210, which may execute identifier generation algorithms to create unique situation identifiers. In some embodiments, the Situation Management Module 210 may generate the unique identifier by invoking a Universally Unique Lexicographically Sortable Identifier (ULID) generation function that produces a 128-bit identifier comprising a 48-bit millisecond-resolution timestamp in the first portion and an 80-bit randomly generated value in the second portion. The generated ULID may be encoded using Crockford Base32 encoding to produce a 26-character sortable string that provides both global uniqueness and lexicographic sortability based on creation time. The embedded timestamp in the ULID enables the system to extract the exact creation time of the digital incident situation directly from the identifier without requiring separate timestamp storage, providing dual functionality as both a unique identifier and a timestamp. In other embodiments, the Situation Management Module 210 may alternatively generate the unique identifier using a UUID generation function that produces a 128-bit universally unique identifier conforming to RFC 4122 specifications, formatted as a hyphenated hexadecimal string. The selected identifier generation method ensures that the unique identifier distinguishes the digital incident situation from all other concurrent and historical incidents stored in the Data Repository 280.

In some embodiments, the Situation Management Module 210 may alternatively generate unique identifiers using timestamp-based methods that concatenate the current Unix timestamp in milliseconds with a random alphanumeric string. In other embodiments, the Situation Management Module 210 may query the Database Engine 270 to retrieve the maximum existing situation identifier value and increment it by one, generating sequential numeric identifiers. The selected identifier generation method may ensure that the unique identifier distinguishes the digital incident situation from all other concurrent and historical incidents stored in the Data Repository 280.

In some embodiments, the Situation Management Module 210 may create an incident situation data structure in memory comprising fields for the unique identifier, situation owner identifier received in step 310, incident name string, incident type identifier, incident location coordinates, geofence radius value, creation timestamp obtained from the system clock, and status flags indicating the situation's active state. This data structure may be implemented as a JSON object, a class instance in object-oriented programming languages, or a structured database record ready for persistence operations.

At step 330, administrative control is assigned to the situation owner. This operation is performed by the Situation Management Module 210, which may establish permission structures that define authorization levels for the digital incident situation. In some embodiments, the Situation Management Module 210 may create an access control list (ACL) entry in the Data Repository 280 that associates the situation owner identifier with an "owner" or "administrator" role having elevated permissions. The ACL entry may be structured as a database record containing fields for the unique identifier generated in step 320, the situation owner identifier, a role type enumeration set to indicate owner privileges, and a permission bitmask or permission array defining allowed operations.

In some embodiments, the permission bitmask may comprise binary flags where each bit position represents a specific system capability, such as modifying incident parameters, adjusting geofence boundaries, approving access requests, creating private communication channels, transferring ownership, and demobilizing situations. The Situation Management Module 210 may set all permission bits to enable full administrative control for the situation owner. In other embodiments, the permission structure may be implemented as a relational database table with columns for situation identifier, user identifier, and boolean flags for each permission type, where TRUE values grant the corresponding permissions.

In some embodiments, the Situation Management Module 210 may execute a database INSERT statement via the Database Engine 270 to persist the ACL entry, writing the situation identifier, user identifier, role type, and permission values to the access control table. This assignment ensures that subsequent authorization checks performed by the Access Control Module 230 recognize the situation owner's administrative control. For example, when the situation owner later attempts to adjust the geofence radius from 4 miles to 10 miles, the Access Control Module 230 may query the permission records to verify that the requesting user possesses the authority to modify geofence boundaries before enabling the modification.

At step 340, incident parameters are initialized. This operation is performed by the Situation Management Module 210, which may execute database write operations to persist incident parameter values in the Data Repository 280 via the Database Engine 270. In some embodiments, the Situation Management Module 210 may construct a SQL INSERT statement containing the incident name, incident type, and incident location extracted in step 310. The INSERT statement may write these values along with the unique identifier, geofence radius, creation timestamp, situation owner identifier, and status indicator to the incident situations table.

In some embodiments, the incident parameters may be stored in a NoSQL document database where the incident situation is represented as a JSON document containing nested objects for incident details, geofence parameters, and metadata. The JSON document structure may include fields for the incident name string, incident type identifier, location object containing latitude and longitude coordinates, geofence object containing center point coordinates and radius, creation timestamp in ISO 8601 format, owner identifier, and status field. The Situation Management Module 210 may invoke document insertion methods provided by the Database Engine 270 to store this structured document.

In some embodiments, the incident location coordinates may serve multiple purposes within the incident management platform. First, the coordinates may serve as incident epicenter documentation representing the center point of the GPS-based geofence that defines the physical incident area. Second, location coordinates may represent positions of individual responders on map interfaces, where each responder's GPS location data is displayed along with their deployment status with respect to the digital incident situation such as ACTIVE, APPROVED, or OFF_DUTY. Third, location coordinates may define arbitrary location markers, also referred to as strategic locations, that situation owners or administrators place on map interfaces to mark operationally significant positions such as triage locations where patients are assessed and treated, reunification locations where evacuated individuals meet family members, volunteer check-in locations where spontaneous volunteers register and receive assignments, or items of concern or interest such as hazardous materials, structural damage, or evidence requiring documentation. The Situation Management Module 210 may store the latitude and longitude values not only in incident parameter fields but also in geofence parameter fields that define the center point coordinates. This ensures that the physical incident area boundary is centered on the incident location by default, which may be subsequently adjusted in response to incident evolution.

The Situation Management Module 210 may store the latitude and longitude values not only in incident parameter fields but also in geofence parameter fields that define the center point coordinates. This ensures that the physical incident area boundary is centered on the incident location by default, which may be subsequently adjusted in response to incident evolution.

At step 350, the geofencing module is activated for establishing a geographic boundary. This operation is performed by the Situation Management Module 210, which may transmit a geofence initialization request to the Geofencing Module 220. In some embodiments, the Situation Management Module 210 may construct a geofence initialization message comprising the unique identifier generated in step 320, the incident location coordinates stored in step 340, and the geofence radius value extracted in step 310. The message may be formatted as a JSON object or structured data packet containing fields for situation identifier, center point latitude, center point longitude, radius specification, and an action type indicating initialization.

In some embodiments, the Situation Management Module 210 may invoke a function call on the Geofencing Module 220 passing the situation identifier, center point coordinates, and radius as parameters. The Geofencing Module 220 may receive this function call, extract the center point coordinates and radius value, and may store these geofence parameters in the Data Repository 280 linked to the unique identifier. In some embodiments, the Geofencing Module 220 may calculate a bounding box for the geofence area by computing minimum and maximum latitude and longitude values that encompass a circle with the specified radius centered at the specified coordinates.

In some embodiments, the radius value may be converted from miles to meters or degrees of latitude and longitude for use in geographic distance calculations. For example, a 4-mile radius may be converted to approximately 6437 meters or approximately 0.058 degrees of latitude. The Geofencing Module 220 may store both the original radius specification and the converted values to enable efficient coordinate comparison operations by the Resource Tracking Module 240. This activation establishes the GPS-based geofence that will control resource visibility determinations throughout the incident lifecycle, where GPS coordinates within the specified radius of the center point will trigger display decisions while coordinates beyond the radius will trigger suppression decisions.

At step 360, a general communication channel is created automatically. This operation is performed by the Situation Management Module 210 in coordination with the Communication Module 250. In some embodiments, the Situation Management Module 210 may transmit a channel creation request to the Communication Module 250 containing the unique identifier and a channel type specification indicating general or public channel characteristics. The Communication Module 250 may generate a channel identifier using similar UUID generation methods as described in step 320, producing a unique channel identifier that distinguishes the channel from other communication channels in the system.

In some embodiments, the Communication Module 250 may create a communication channel record in the Data Repository 280 containing fields for the channel identifier, the situation identifier linking the channel to the digital incident situation, a channel name defaulted to "General," a channel type field indicating general channel characteristics, an access level field specifying that all approved users may access the channel, and a creation timestamp. The general communication channel implements the same encryption standards as all other communication channels in the system, utilizing Transport Layer Security (TLS) protocols for encrypting data in transit across the Network 190 and relying on operating system-level or database-level encryption for encrypting data at rest when messages are stored in the Data Repository 280. The Communication Module 250 may execute a database INSERT statement to persist this channel record with these field values in the communication channels table.

In some embodiments, the Communication Module 250 may establish a communication infrastructure for the channel by allocating server resources such as creating a message queue, establishing WebSocket connections for real-time messaging, or provisioning Voice over IP (VoIP) conference bridges. The automatic creation ensures that immediate coordination capability is available without requiring explicit channel creation requests from the situation owner. For example, when the first responder user gains access to the "Wildland Fire Evac. near Camp Bullis" situation, they immediately see the "General" channel available for coordination without the situation owner needing to manually create it.

At step 370, the situation record is stored in the data repository. This operation is performed by the Situation Management Module 210 via the Database Engine 270, which may execute database write operations to persist the complete digital incident situation in the Data Repository 280. In some embodiments, this step may involve committing a database transaction that atomically writes all records created in steps 320 through 360, ensuring that the incident situation, permission assignments, incident parameters, geofence parameters, and general communication channel are all persisted as a consistent unit. If any write operation fails, the entire transaction may be rolled back to prevent partial situation creation.

In some embodiments, the Database Engine 270 may execute multiple INSERT statements in sequence, beginning with the incident situations table, followed by the permissions table, followed by the geofence parameters table, followed by the communication channels table. The Database Engine 270 may return success confirmations to the Situation Management Module 210 as each write operation completes. In some embodiments, the stored situation record may include metadata fields documenting the creation timestamp with millisecond precision, the source IP address of the user computing device 145 that submitted the situation creation request, and system version information identifying which version of the application program 200 processed the request.

In some embodiments, the Database Engine 270 may generate audit log entries documenting changes to records throughout the incident lifecycle. The audit logging mechanism operates on a change-tracking basis where audit records are created only when records are modified, with the original record in operational tables serving as the initial audit state and the current record representing the latest state. When the situation record is created in step 370, the initial record stored in the Data Repository 280 serves as the baseline documentation without requiring a separate audit entry for the creation event itself. Subsequently, when situation records are modified such as adjusting geofence parameters, changing situation owner assignments, or updating incident classifications, the Database Engine 270 may create audit table entries documenting the previous state before modification. These audit entries may include the unique identifier, the user identifier who performed the modification, the operation type indicating the nature of the change, previous parameter values, new parameter values, and timestamps with millisecond precision. The audit entries capture a complete change history enabling reconstruction of how situation records evolved throughout the incident lifecycle. In some embodiments, the Database Engine 270 may synchronize the situation record with External Emergency Response Systems 285 by transmitting the incident data formatted according to Federal Emergency Management Agency (FEMA) National Incident Management System (NIMS) data exchange specifications, enabling regional coordination centers to gain immediate visibility into newly created incidents.

In some embodiments, the operations of steps 310 through 370 occur automatically upon receipt of a situation creation request, completing within milliseconds to seconds depending on database performance and network latency. In other embodiments, the operations may include additional validation steps such as verifying that the specified incident location falls within the organization's jurisdiction, checking that the situation owner has appropriate authority to create incidents of the specified type, or confirming that sufficient system resources are available to support the new digital incident situation. The automated execution of these steps reduces the time required to establish incident coordination capabilities from minutes or hours required by manual radio-based coordination setup to less than 10 seconds, enabling incident commanders to initiate multi-agency response coordination immediately upon recognizing emergency situations.

Figure 4:
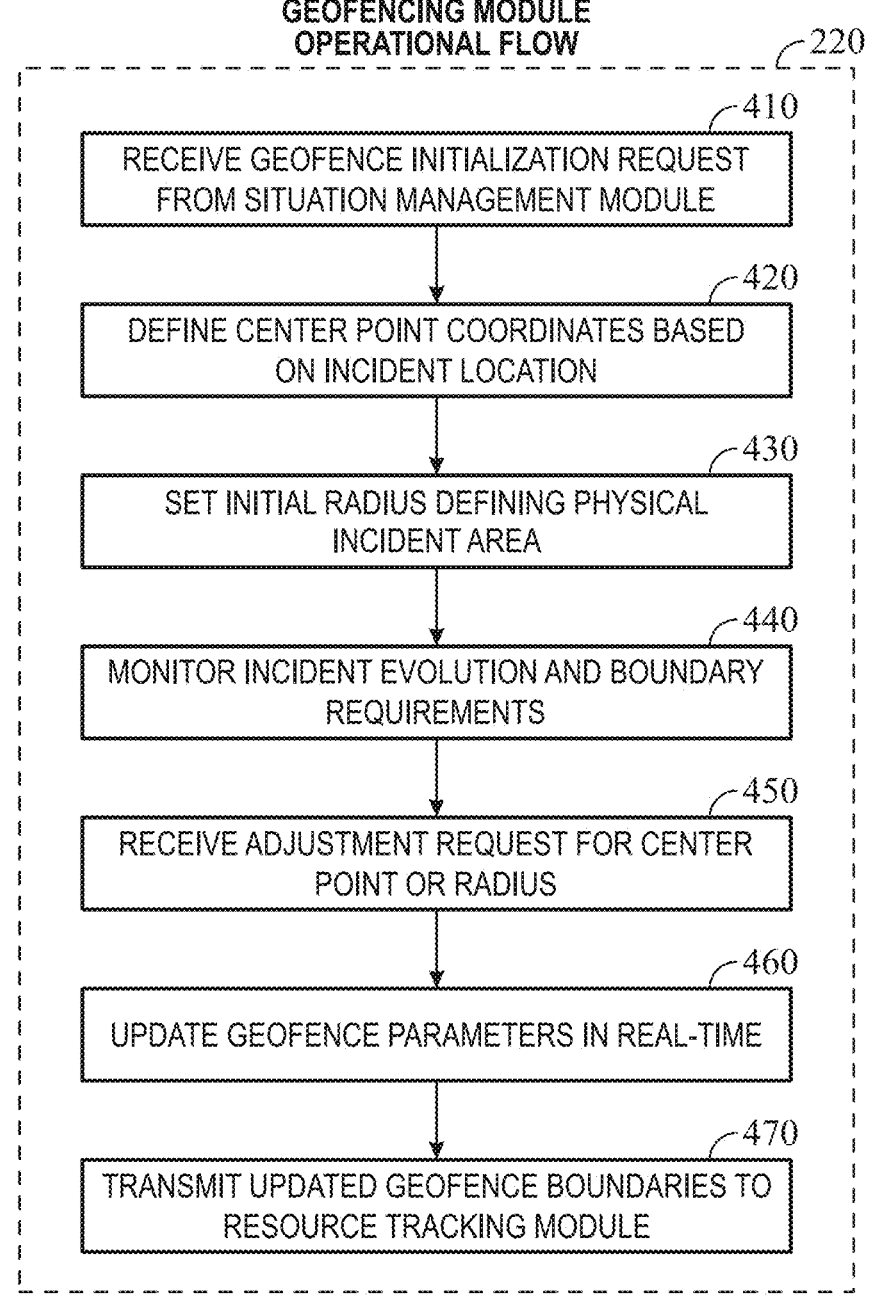
FIG. 4 is a flow diagram illustrating an exemplary operational sequence of the Geofencing Module, according to some embodiments.

FIG. 4 is a flow diagram illustrating an exemplary operational sequence of the Geofencing Module 220 in accordance with certain embodiments. The sequence shown may be implemented as computer-executable instructions within the application program 200 operating on computing system 100 of FIG. 2, with specific operations performed by the modules depicted therein.

At step 410, a geofence initialization request is received from the situation management module. This operation may be performed by the Geofencing Module 220, which receives the initialization request transmitted by the Situation Management Module 210 as described in step 350 of FIG. 3. In some embodiments, the geofence initialization request may be formatted as a structured message containing the unique identifier for the digital incident situation, latitude and longitude coordinates for the incident location, and a radius value specifying the extent of the physical incident area. The Geofencing Module 220 may parse the received message to extract these parameter values for establishing the GPS-based geofence comprising an adjustable center point and an adjustable radius.

At step 420, the adjustable center point is defined based on the incident location. This operation is performed by the Geofencing Module 220, which establishes the geographic center of the GPS-based geofence. In some embodiments, the Geofencing Module 220 may extract the latitude and longitude values from the initialization request and may define these coordinates as the adjustable center point of the GPS-based geofence. The adjustable center point coordinates may be stored in the Data Repository 280 via the Database Engine 270 in a geofence parameters table linked to the unique identifier. In some embodiments, the latitude coordinate may be stored as a decimal degree value with precision to six decimal places, providing accuracy within approximately one meter, while the longitude coordinate may be stored with equivalent precision.

In some embodiments, the Geofencing Module 220 may validate that the adjustable center point coordinates fall within acceptable geographic ranges, such as verifying that latitude values are between −90 and +90 degrees and longitude values are between −180 and +180 degrees. The Geofencing Module 220 may also verify that the adjustable center point corresponds to a location within the organization's operational jurisdiction by comparing the coordinates against predefined geographic boundaries stored in the Data Repository 280. For example, when a wildfire evacuation situation is created for Camp Bullis, Texas, the Geofencing Module 220 may validate that the adjustable center point falls within the service area of the responding fire department before proceeding with GPS-based geofence establishment.

At step 430, the adjustable radius is set defining the physical incident area. This operation is performed by the Geofencing Module 220, which establishes the distance from the adjustable center point within which the GPS-based geofence will encompass. In some embodiments, the Geofencing Module 220 may extract the radius value from the initialization request, where the adjustable radius may be specified in miles, kilometers, meters, or other distance units. The Geofencing Module 220 may convert the adjustable radius to a standardized unit for internal calculations, such as converting miles to meters by multiplying by 1609.34 or converting kilometers to meters by multiplying by 1000.

In some embodiments, the Geofencing Module 220 may calculate derived parameters from the adjustable radius to optimize subsequent coordinate comparison operations performed by the Resource Tracking Module 240. These derived parameters may include computing the radius squared to enable distance comparisons without computationally expensive square root operations. The Geofencing Module 220 may also calculate bounding box coordinates by determining the minimum and maximum latitude and longitude values that encompass the circular physical incident area defined by the adjustable center point and adjustable radius. In some embodiments, the maximum latitude may be calculated by adding the adjustable radius in degrees to the adjustable center point latitude, while the minimum latitude may be calculated by subtracting the adjustable radius in degrees from the adjustable center point latitude, with similar calculations for longitude boundaries.

In some embodiments, the Geofencing Module 220 may store the adjustable radius along with the derived parameters in the geofence parameters table. For example, when the adjustable radius is set to 4 miles for the Camp Bullis wildfire situation, the Geofencing Module 220 may store 4.0 as the original adjustable radius in miles, 6437.376 as the converted adjustable radius in meters, 41,439,768 as the radius squared in square meters, and calculated bounding box coordinates defining the geographic extent of the physical incident area. This stored GPS-based geofence definition enables the Resource Tracking Module 240 to determine whether responder GPS coordinates fall within or outside the physical incident area through efficient coordinate comparison algorithms.

At step 440, incident evolution and boundary requirements are monitored. This operation is performed by the Geofencing Module 220, which may evaluate whether the current adjustable center point and adjustable radius remain appropriate for the evolving incident. In some embodiments, the Geofencing Module 220 may receive incident status updates from the Situation Management Module 210 indicating changes in incident scope, such as fire spread in wildfire incidents, evacuation zone expansions, or operational perimeter modifications that may require adjustment to the GPS-based geofence boundaries. In typical implementations, geofence adjustments are initiated manually by situation owners or administrators who evaluate incident conditions and determine when center point or radius modifications are needed based on operational judgment and field observations. In some embodiments, the Geofencing Module 220 may implement automated adjustment algorithms that analyze incident data such as fire perimeter progression rates, evacuation completion percentages, or responder density distributions to generate recommended geofence modifications or to automatically adjust the adjustable center point or adjustable radius when predefined threshold conditions are met. The monitoring functionality, whether manual or automated, enables the system to adapt the physical incident area as incidents evolve rather than maintaining static boundaries that may become inappropriate as operational conditions change.

In some embodiments, the monitoring operation may be event-driven, where the Geofencing Module 220 responds to explicit notifications from situation owners or incident commanders indicating that the adjustable center point or adjustable radius needs modification. In other embodiments, the monitoring may be time-based, where the Geofencing Module ule 220 periodically evaluates incident conditions at configured intervals such as every 5 minutes, 15 minutes, or hourly depending on incident type and severity. The monitoring functionality enables the system to adapt the physical incident area as incidents evolve rather than maintaining static boundaries that may become inappropriate as operational conditions change.

At step 450, an adjustment request for the adjustable center point or the adjustable radius is received. This operation is performed by the Geofencing Module 220, which receives modification requests from situation owners via the User Interface Module 265. In some embodiments, situation owners may submit adjustment requests through map interfaces displayed on user computing devices 145, where they may drag the center point marker to a new location to adjust the adjustable center point or may modify a radius slider control to adjust the adjustable radius. The User Interface Module 265 may capture the new adjustable center point coordinates from the updated marker position or may capture the new adjustable radius value from the slider control, and may transmit these updated parameters to the Geofencing Module 220.

In some embodiments, the adjustment request may specify modification to only the adjustable center point while maintaining the current adjustable radius, modification to only the adjustable radius while maintaining the current adjustable center point, or simultaneous modifications to both the adjustable center point and adjustable radius. For example, as a wildfire spreads from the original Camp Bullis location toward nearby residential areas, the situation owner may adjust the adjustable center point coordinates to track the fire's progression while simultaneously adjusting the adjustable radius from 4 miles to 10 miles to encompass expanded evacuation zones. The Geofencing Module 220 may parse the adjustment request to determine which parameters of the GPS-based geofence are being modified and may extract the new values for updating operations.

In some embodiments, the Geofencing Module 220 may validate adjustment requests before accepting them by verifying that the requesting user possesses administrative control permissions for the digital incident situation. The Geofencing Module 220 may query the Access Control Module 230 to confirm that the user identifier in the adjustment request matches a situation owner or administrator role in the permission records. This validation prevents unauthorized users from adjusting the GPS-based geofence, ensuring that only authorized incident commanders can adjust the physical incident area definition.

At step 460, the adjustable center point or the adjustable radius is adjusted in real-time. This operation is performed by the Geofencing Module 220, which applies the new coordinates or new radius values received in step 450. In some embodiments, the Geofencing Module 220 may execute database UPDATE statements via the Database Engine 270 to adjust the stored parameters of the GPS-based geofence in the Data Repository 280. The UPDATE operation may replace the previous adjustable center point latitude and longitude values with the new coordinates, or may replace the previous adjustable radius value with the new distance specification, or may adjust both the adjustable center point and adjustable radius simultaneously depending on the adjustment request content.

In some embodiments, the Geofencing Module 220 may recalculate all derived geofence parameters when adjustments are applied in real-time. When the adjustable radius is adjusted from 4 miles to 10 miles, the Geofencing Module 220 may recalculate the radius in meters, the radius squared for distance comparisons, and the bounding box coordinates encompassing the expanded physical incident area. When the adjustable center point is adjusted to new coordinates, the Geofencing Module 220 may recalculate the bounding box relative to the new center location. These recalculations ensure that subsequent coordinate comparison operations by the Resource Tracking Module 240 use current GPS-based geofence parameters reflecting the adjusted boundaries of the physical incident area.

In some embodiments, the Geofencing Module 220 may maintain a modification history by storing previous adjustable center point values and previous adjustable radius values along with timestamps indicating when adjustments occurred. This historical record enables incident analysis to reconstruct how the GPS-based geofence and physical incident area evolved throughout the incident lifecycle. The Geofencing Module 220 may also generate audit log entries documenting each adjustment to the adjustable center point or adjustable radius, including the user identifier of who requested the modification, the previous parameter values, the new parameter values, and the timestamp when the adjustment was applied in real-time. These audit entries may be transmitted to the Audit Module 260 for comprehensive incident documentation.

At step 470, the adjusted GPS-based geofence boundaries are transmitted to the resource tracking module. This operation is performed by the Geofencing Module 220, which notifies the Resource Tracking Module 240 that the adjustable center point or adjustable radius has been adjusted. In some embodiments, the Geofencing Module 220 may transmit a boundary update message containing the unique identifier and the adjusted center point coordinates and adjusted radius values defining the modified physical incident area. The Resource Tracking Module 240 may receive this update message and may immediately re-evaluate all tracked responder GPS locations against the adjusted GPS-based geofence boundaries to determine whether display visibility decisions need to be modified.

In some embodiments, the transmission may trigger the Resource Tracking Module 240 to recalculate distances between each responder's current GPS coordinates and the adjusted center point using the adjusted radius value. Responders who were previously within the GPS-based geofence boundaries but are now outside the adjusted physical incident area may have their GPS locations suppressed from map displays. Conversely, responders who were previously outside the GPS-based geofence boundaries but are now within the adjusted physical incident area may have their GPS locations displayed on map interfaces. For example, when the wildfire GPS-based geofence expands from a 4-mile adjustable radius to a 10-mile adjustable radius, responders staged at distant locations who were previously outside the physical incident area may now appear on the incident commander's map display, providing visibility into additional available resources.

In some embodiments, the Geofencing Module 220 may broadcast the adjusted GPS-based geofence parameters to multiple system components beyond the Resource Tracking Module 240, such as notifying the User Interface Module 265 to refresh map displays showing the adjusted center point and adjusted radius visualization, or notifying the Audit Module 260 to log the boundary adjustment event. This coordinated notification ensures that all system components operate with current GPS-based geofence parameters and that users viewing map interfaces see the adjusted physical incident area boundary immediately without requiring manual screen refreshes. The real-time adjustment capability enables dynamic incident management where the GPS-based geofence comprising the adjustable center point and adjustable radius adapts to evolving operational conditions without system downtime or manual reconfiguration.

Figure 5:
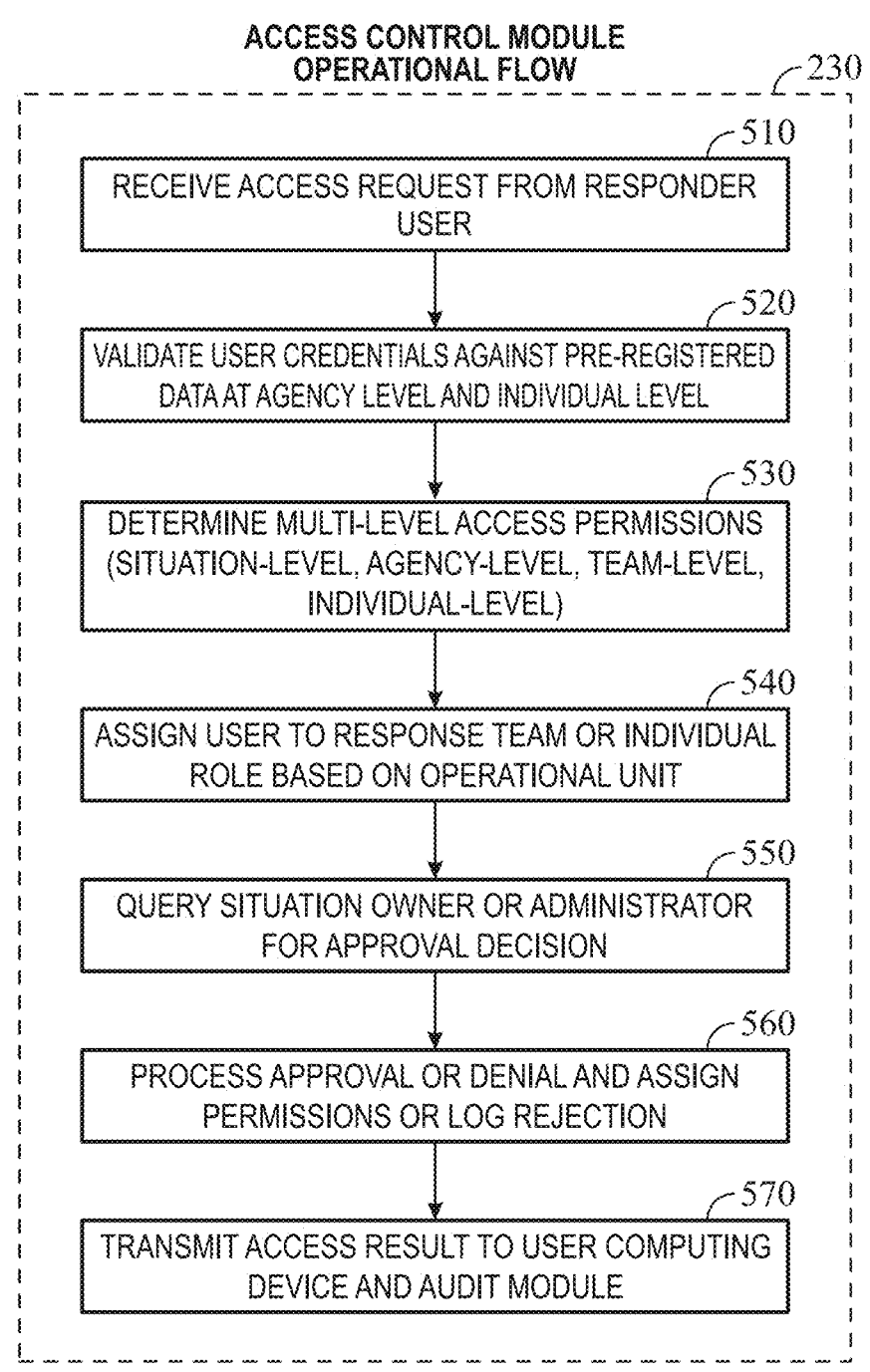
FIG. 5 is a flow diagram illustrating an exemplary operational sequence of the Access Control Module, according to some embodiments.

FIG. 5 is a flow diagram illustrating an exemplary operational sequence of the Access Control Module 230 in accordance with certain embodiments. The sequence shown may be implemented as computer-executable instructions within the application program 200 operating on computing system 100 of FIG. 2, with specific operations performed by the modules depicted therein.

At step 510, an access request is received from a responder user. This operation may be performed by the Access Control Module 230 in coordination with the User Interface Module 265. In some embodiments, responder users may browse available digital incident situations through a situations list interface displayed on user computing devices 145 and may select a specific incident to request access. The User Interface Module 265 may generate an access request message containing the unique identifier of the selected digital incident situation and the user identifier of the requesting responder, and may transmit this message to the Access Control Module 230.

In some embodiments, the access request may include additional information such as the responder's agency affiliation, organizational role, requested operational unit assignment, and justification for access. For example, when a paramedic from HEMS (Llano) requests access to a school shooting incident, the access request may indicate the user's agency as "HEMS (Llano)," their role as "Paramedic," their requested team assignment as "Medic 22," and their credentials including "Tactical Paramedic, Flight Paramedic, Admin." The Access Control Module 230 may extract these parameters from the access request for use in subsequent validation and permission determination operations.

At step 520, user credentials are validated against pre-registered data at agency level and individual level. This operation is performed by the Access Control Module 230, which executes credential verification queries against the Data Repository 280. In some embodiments, the Access Control Module 230 may first validate at agency level by querying whether the requesting user's agency affiliation corresponds to an authorized response agency for the incident type. The Access Control Module 230 may retrieve a list of authorized agencies from the Data Repository 280 based on the incident type, and may compare the requesting user's agency identifier against this authorized agencies list.

In some embodiments, the agency-level validation may verify that mutual aid agreements, automatic aid arrangements, or incident-specific agency authorizations exist between the user's agency and the incident jurisdiction. When a responder user requests access to a digital incident situation, the Access Control Module 230 may compile available information about the requesting user including service type, operational unit assignment, equipment certifications, professional credentials, rank or position, agency affiliation, and historical incident participation records. In typical implementations, this compiled information is presented to the situation owner or administrator through the User Interface Module 265, enabling human review and manual approval or denial decisions based on operational judgment and incident-specific requirements. In some embodiments, the Access Control Module 230 may implement automated approval workflows based on preset authorization requirements configured by situation owners or system administrators. The preset requirements may be provided to a rules engine that evaluates whether requesting users satisfy predefined criteria such as possession of required certifications, affiliation with pre-authorized agencies, assignment to specific operational units, or meeting minimum rank thresholds. When the rules engine determines that all preset requirements are satisfied, the Access Control Module 230 may automatically grant access without requiring manual approval from situation owners. For example, when a paramedic from HEMS (Llano) requests access to an incident managed by Austin Fire Department, the Access Control Module 230 may query whether HEMS (Llano) has a mutual aid agreement with Austin Fire Department or whether HEMS (Llano) has been explicitly authorized to participate in the specific incident by the situation owner. If no such authorization exists and automated approval rules are not configured, the agency-level validation may require manual review, with the situation owner evaluating the paramedic's credentials before making an approval or denial decision.

In some embodiments, following successful agency-level validation, the Access Control Module 230 may validate at individual level by verifying the requesting user's credentials and certification status. The Access Control Module 230 may query a user credentials table in the Data Repository 280 to retrieve the user's stored credentials, certification types, certification expiration dates, and qualification levels. The Access Control Module 230 may verify that required certifications are current by comparing expiration dates to the current system date. In some embodiments, the Access Control Module 230 may also verify that the user's credentials match the requirements for their requested operational role, such as confirming that a user requesting assignment as a "Flight Paramedic" possesses valid flight paramedic certification.

At step 530, multi-level access permissions are determined. This operation is performed by the Access Control Module 230, which evaluates permission requirements at situation-level, agency-level, team-level, and individual-level. In some embodiments, the Access Control Module 230 may determine situation-level permissions by checking whether the digital incident situation is configured to enable open access to all authorized agencies or whether it requires explicit approval for each access request. The situation-level permission setting may be stored as a configuration flag in the incident situation record indicating "open" or "approval-required" access mode.

In some embodiments, the Access Control Module 230 may determine agency-level permissions by evaluating whether the requesting user's agency has been granted blanket access to the incident or whether agency participation requires per-user approval. The Access Control Module 230 may query an authorized agencies table linked to the situation identifier to determine the agency's permission level. In some embodiments, agencies may be assigned permission levels such as "full_access," "restricted_access," or "approval_required" that control whether their personnel may access the incident automatically or must await situation owner approval. In some implementations, agency-level permissions are limited to organizational management functions such as adding users to the agency roster, updating user credentials and certifications, or archiving user accounts when personnel leave the agency. Access to specific digital incident situations and communication channels operates through separate permission tiers that require approval from situation owners, situation administrators, channel owners, or channel administrators rather than being controlled at the agency level. This separation ensures that agencies do not automatically gain control over or access to incidents occurring in other jurisdictions, maintaining appropriate operational boundaries where each incident is managed by its designated situation owner. In some embodiments, the Access Control Module 230 may implement exceptions for oversight agencies such as state emergency management departments, governor's offices, or federal coordinating entities that possess jurisdictional authority spanning multiple local agencies. Such oversight agencies may be granted elevated permissions enabling situational visibility or participation across jurisdictional boundaries without requiring per-incident approval from local situation owners.

In some embodiments, the Access Control Module 230 may determine team-level permissions by evaluating whether the requested operational unit assignment is authorized for the user's agency and role. The Access Control Module 230 may query team configuration records to verify that the requested team exists, that the team is accepting new members, and that the user's credentials qualify them for the requested team role. For example, when a paramedic requests assignment to "Medic 22," the Access Control Module 230 may verify that Medic 22 is a valid medical response team, that the team has capacity for additional members, and that the user possesses paramedic credentials qualifying them for medical team assignment. In some implementations, the compiled team information is presented to the situation owner or administrator through the User Interface Module 265 for manual review and approval decisions. The situation owner may evaluate whether the team's capabilities align with operational needs, whether the team's agency has appropriate jurisdictional authority, and whether team member credentials satisfy incident requirements before approving or denying the team access request. In some embodiments, the Access Control Module 230 may implement automated team approval workflows where preset criteria such as team certifications, equipment inventories, or mutual aid agreement status are evaluated by a rules engine to automatically accept or reject team access requests without manual review. For example, when a paramedic requests assignment to "Medic 22," the Access Control Module 230 may verify that Medic 22 is a valid medical response team, that the team has capacity for additional members, and that the user possesses paramedic credentials qualifying them for medical team assignment.

In some embodiments, the Access Control Module 230 may determine individual-level permissions by evaluating the specific capabilities that should be granted to the user based on their role and credentials. Individual-level permissions may control whether the user can view GPS locations of other responders, access specific communication channels, submit resource requests, or perform other system functions. The Access Control Module 230 may generate a permission set by combining permissions inherited from agency-level and team-level assignments with user-specific permissions derived from credential validation results. This multi-level permission determination ensures that access control operates at appropriate granularity levels from broad organizational authorization down to specific user capability grants.

At step 540, the user is assigned to a response team based on operational unit. This operation is performed by the Access Control Module 230, which creates team membership records linking users to teams and situations. In some embodiments, the Access Control Module 230 implements a team-based organizational architecture where all responder users are assigned to teams regardless of whether they participate as part of multi-member operational units or as individual responders. Individual responders who are not part of larger operational units are assigned to single-member teams, enabling uniform treatment of all responders through consistent team-based data structures and access control mechanisms. This architectural approach ensures that individual responders and multi-member teams are processed through identical workflows for access requests, approval decisions, deployment tracking, and resource coordination. In some embodiments, when the access request specifies a requested team assignment such as "Medic 22" or "Quick service team," the Access Control Module 230 may create a team membership record in the Data Repository 280 associating the user identifier with the team identifier and the situation identifier. When an individual responder requests access without specifying a multi-member team, the Access Control Module 230 may create a single-member team record for that responder and may associate the user identifier with the single-member team identifier and the situation identifier, enabling the individual to be tracked and managed using the same team-based mechanisms applied to larger operational units. The team membership record may include fields documenting the user's role within the team, the timestamp when assignment occurred, and the assignment status indicating "pending" if approval is required or "active" if assignment is automatic.

In some embodiments, the Access Control Module 230 may assign operational roles to users within their team assignments, regardless of whether the team is a single-member team or a multi-member operational unit. The team membership record may document the user's operational role such as "entry supervisor," "attendant," "entrant," "rescue lead," "incident commander," "logistics coordinator," or other function-specific designations that define the user's responsibilities within the incident response. The uniform team-based architecture simplifies organizational structure management by applying consistent data models, access control mechanisms, and tracking workflows across all responders whether they participate individually or as part of larger teams. In some embodiments, the Access Control Module 230 may also record operational unit identifiers, equipment assignments, vehicle or apparatus designations, radio call signs, and other organizational metadata associated with the user's incident participation within the team membership records stored in the Data Repository 280. This metadata enables incident commanders to identify not only which responders are deployed but also what equipment they have available, what operational functions they are performing, and how they fit within the overall incident organizational structure.

At step 550, the situation owner or administrator is queried for an approval decision. This operation is performed by the Access Control Module 230 when the multi-level permission determination in step 530 indicates that situation owner approval is required before granting access. In some embodiments, the Access Control Module 230 may generate an approval request notification containing the requesting user's identifier, name, agency affiliation, role, credentials, and requested team assignment. The Access Control Module 230 may transmit this notification to the situation owner's user computing device 145 via the User Interface Module 265.

In some embodiments, the User Interface Module 265 may display the approval request in an approval queue interface showing all pending access requests with summary information for each requester. The situation owner may interact with the approval queue to review requester details, view their credentials and certifications, and may select approval or denial actions for each request. For example, when reviewing an access request from "Arthur Marshall" affiliated with "WCEMS" requesting assignment as "FTO" with "EMT-P" credentials, the situation owner may view a member profile display showing the requester's full name, organization, rank, credentials, phone number, and GPS coordinates before making an approval decision.

In some embodiments, the Access Control Module 230 may implement timeout mechanisms where access requests that remain unapproved beyond a configured time threshold are automatically denied or escalated to backup administrators. This prevents access requests from remaining indefinitely in pending state when situation owners are occupied with other incident management activities. In some embodiments, the Access Control Module 230 may also support batch approval operations where situation owners can approve multiple requests simultaneously, such as approving all requests from a specific agency or approving all requests for a specific team assignment.

At step 560, approval or denial is processed and permissions are assigned or rejection is logged. This operation is performed by the Access Control Module 230, which receives the situation owner's decision from the User Interface Module 265. In some embodiments, when the decision indicates approval, the Access Control Module 230 may update the user's assignment record status from "pending" to "approved" and may create permission records in the Data Repository 280 granting the user access to the digital incident situation. The permission records may specify which system functions the user may access, which communication channels they can view, whether their GPS location will be tracked, and other operational capabilities.

In some embodiments, the Access Control Module 230 may assign permissions by executing database INSERT statements that write permission records linking the user identifier to the situation identifier with specified permission levels. The assigned permissions may enable the user to view map interfaces showing the incident geofence and other responder locations, access communication channels for operational coordination, submit status updates, and perform other response activities. When the decision indicates denial, the Access Control Module 230 may update the access request record status to "denied" and may log the rejection reason provided by the situation owner to the Audit Module 260.

In some embodiments, the logged rejection record may include the user identifier of who was denied, the situation identifier for which access was requested, the timestamp when denial occurred, the situation owner identifier indicating who made the denial decision, and a rationale text field documenting why access was denied. This rejection logging creates an audit trail of access control decisions that documents both approved and denied requests, enabling incident analysis to reconstruct who was granted or refused participation in incident operations and why those decisions were made.

At step 570, the access result is transmitted to the user computing device and audit module. This operation is performed by the Access Control Module 230, which notifies both the requesting user and the audit logging system of the access control decision. In some embodiments, the Access Control Module 230 may transmit an approval notification to the requesting user's computing device 145 via the User Interface Module 265 when access is granted. The approval notification may include the assigned permissions, team assignment details, communication channel access information, and instructions for beginning incident participation.

In some embodiments, when the user receives the approval notification, the User Interface Module 265 may automatically navigate the user's display to the incident map interface showing the geofence boundary, other responder GPS locations, and available communication channels. This immediate interface transition enables approved users to begin operational coordination without requiring manual navigation through system menus. When access is denied, the Access Control Module 230 may transmit a denial notification explaining why access was not granted, such as indicating "Access denied by situation owner: insufficient credentials for requested role" or "Access denied: agency not authorized for this incident type."

In some embodiments, the Access Control Module 230 may transmit audit log entries to the Audit Module 260 documenting the complete access control transaction. The audit entries may include the access request details, credential validation results, multi-level permission determinations, team assignment information, situation owner approval decision, and the final access result. These comprehensive audit records enable after-action analysis to review who requested access, what credentials they possessed, whether they were approved or denied, who made the decision, and when the decision occurred. The audit trail supports accountability for access control decisions and provides documentation for regulatory compliance reporting when required by emergency management standards.

FIG. 6 is a flow diagram illustrating an exemplary operational sequence of the Resource Tracking Module 240 in accordance with certain embodiments. The sequence shown may be implemented as computer-executable instructions within the application program 200 operating on computing system 100 of FIG. 2, with specific operations performed by the modules depicted therein.

At step 610, GPS location data is received from responder computing devices. This operation may be performed by the Resource Tracking Module 240, which establishes communication connections with user computing devices 145 carried by responder resources via the Network 190. In some embodiments, the user computing devices 145 may be smartphones or tablets executing mobile applications that continuously obtain GPS coordinates from GPS/Location Services 290. The mobile applications may transmit GPS location data packets to the Resource Tracking Module 240 at regular intervals such as every 5 seconds, 10 seconds, or 30 seconds depending on configured update frequency and battery conservation settings.

In some embodiments, the GPS location data packets may be formatted as JSON messages or binary data structures containing fields for user identifier, situation identifier, latitude coordinate, longitude coordinate, altitude value, accuracy radius indicating GPS precision, heading direction, speed of movement, and timestamp indicating when the GPS coordinates were captured. The Resource Tracking Module 240 may receive these data packets through HTTP POST requests to a location update API endpoint, WebSocket connections providing persistent communication channels, or Message Queuing Telemetry Transport (MQTT) protocol commonly used for Internet of Things (IoT) device communications. The Resource Tracking Module 240 may parse received GPS location data to extract the GPS coordinates and associated metadata for processing.

In some embodiments, the Resource Tracking Module 240 may validate received GPS location data by checking that latitude values fall between −90 and +90 degrees, longitude values fall between −180 and +180 degrees, accuracy radius indicates sufficient GPS precision such as less than 50 meters, and timestamps are recent such as within the last 60 seconds. GPS location data failing validation checks may be discarded or flagged for manual review to prevent display of erroneous position information. For example, when a responder's GPS signal is lost inside a building, their user computing device 145 may transmit GPS location data with a large accuracy radius exceeding 1000 meters, which the Resource Tracking Module 240 may identify as unreliable and may suppress from display until GPS accuracy improves.

At step 620, GPS coordinates are compared to the GPS-based geofence. This operation is performed by the Resource Tracking Module 240, which determines whether each responder resource is within the GPS-based geofence or outside the GPS-based geofence. In some embodiments, the Resource Tracking Module 240 may retrieve the current adjustable center point coordinates and adjustable radius for the GPS-based geofence from the Geofencing Module 220 or from the Data Repository 280. The Resource Tracking Module 240 may calculate the distance between the responder's GPS coordinates and the adjustable center point using the Haversine formula or Vincenty formula that compute great-circle distances between two points on a sphere accounting for Earth's curvature.

In some embodiments, the Haversine formula calculation may involve computing the angular distance in radians between the two coordinate pairs, then multiplying by Earth's mean radius of approximately 6371 kilometers to obtain distance in kilometers. The Resource Tracking Module 240 may compare the calculated distance to the adjustable radius of the GPS-based geofence. When the calculated distance is less than or equal to the adjustable radius, the Resource Tracking Module 240 may determine that the responder resource is within the GPS-based geofence. When the calculated distance exceeds the adjustable radius, the Resource Tracking Module 240 may determine that the responder resource is outside the GPS-based geofence.

In some embodiments, the Resource Tracking Module 240 may implement computational optimizations to reduce processing overhead for large numbers of responder resources. The Resource Tracking Module 240 may perform preliminary bounding box checks by comparing responder GPS coordinates to the minimum and maximum latitude and longitude boundaries of the GPS-based geofence. Responders whose coordinates fall outside the bounding box are immediately classified as outside the GPS-based geofence without requiring distance calculations. Only responders whose coordinates fall within the bounding box require precise Haversine formula calculations. This optimization may reduce computational load by 50-70% when most responders are distant from the physical incident area.

At step 630, a determination is made whether the responder is within or outside the geofence boundaries. This operation is performed by the Resource Tracking Module 240 based on the comparison results from step 620. In some embodiments, the Resource Tracking Module 240 may evaluate the calculated distance against the adjustable radius and may set a position status flag indicating "within_geofence" or "outside_geofence" for each responder resource. The position status determination controls whether the responder's GPS location will be displayed on map interfaces or suppressed from display as described in subsequent steps.

In some embodiments, the Resource Tracking Module 240 may detect boundary crossing events by comparing the current position status to the previously stored position status for each responder. When a responder's position status changes from "outside_geofence" to "within_geofence," the Resource Tracking Module 240 may identify this as an entry event indicating the responder has crossed into the physical incident area. When a responder's position status changes from "within_geofence" to "outside_geofence," the Resource Tracking Module 240 may identify this as an exit event indicating the responder has departed the physical incident area. These boundary crossing detections trigger timestamp recording operations described in step 660.

At step 640, GPS locations are displayed on a map interface when the responder is within the GPS-based geofence. This operation is performed by the Resource Tracking Module 240 in coordination with the User Interface Module 265. In some embodiments, the Resource Tracking Module 240 may transmit position display messages to the User Interface Module 265 containing the responder's GPS coordinates, user identifier, name, agency affiliation, role assignment, and current timestamp. The User Interface Module 265 may render these GPS locations as position markers on map interfaces displayed on user computing devices 145 of incident commanders and other authorized personnel.

In some embodiments, the position markers may be rendered as icons, symbols, or avatars overlaid on base map imagery at the latitude and longitude coordinates corresponding to each responder's GPS location. The markers may be color-coded by agency affiliation, shaped differently based on role assignments, or sized according to team designations to enable rapid visual identification of resource types and organizational affiliations. For example, when a HEMS (Llano) paramedic is within the GPS-based geofence for a school shooting incident, their GPS location may be displayed as a red medical cross icon positioned at their current coordinates on the incident commander's map display.

In some embodiments, the displayed GPS locations may include additional information accessible through interactive elements such as clicking or tapping position markers to reveal details including responder name, agency, role, credentials, contact information, entry timestamp showing how long they have been in the physical incident area, and recent position history. This detailed information enables incident commanders to understand not only where responders are located but also who they are, what capabilities they possess, and how long they have been deployed to the incident.

At step 650, GPS locations are suppressed from display when the responder is outside the GPS-based geofence. This operation is performed by the Resource Tracking Module 240, which withholds position data from the User Interface Module 265 for responders determined to be outside the GPS-based geofence in step 630. In some embodiments, the Resource Tracking Module 240 may filter the set of responder GPS locations before transmitting to the User Interface Module 265, including only those responders whose position status indicates "within_geofence" while excluding responders whose position status indicates "outside_geofence."

In some embodiments, the suppression ensures that map interfaces display only responders actively deployed within the physical incident area, avoiding clutter from responders who have demobilized, who are staged at distant locations awaiting deployment, or who are traveling to the incident but have not yet arrived. For example, when a paramedic completes their shift and departs the wildfire evacuation area, crossing outside the GPS-based geofence with the 10-mile adjustable radius, their GPS location immediately disappears from incident commanders' map displays even though the system continues receiving GPS location data from their user computing device 145. This selective visibility based on GPS-based geofence position enables incident commanders to maintain accurate situational awareness of resources within the operational area.

At step 660, entry timestamps and exit timestamps are recorded for boundary crossings. This operation is performed by the Resource Tracking Module 240, which logs temporal data documenting when responder resources enter and depart the physical incident area. In some embodiments, when the Resource Tracking Module 240 detects an entry event where a responder transitions from outside the GPS-based geofence to within the GPS-based geofence, the Resource Tracking Module 240 may record an entry timestamp capturing the date and time when the boundary crossing occurred. The entry timestamp may be obtained from the timestamp field in the GPS location data packet that first indicated the responder was within the GPS-based geofence, or may be generated from the system clock when the boundary crossing is detected.

In some embodiments, the Resource Tracking Module 240 may store entry timestamps in a deployment tracking table in the Data Repository 280 via the Database Engine 270, creating records that associate each responder's user identifier with the situation identifier, the entry timestamp, and a deployment status flag set to "active." When the Resource Tracking Module 240 subsequently detects an exit event where the responder transitions from within the GPS-based geofence to outside the GPS-based geofence, the Resource Tracking Module 240 may record an exit timestamp capturing when the responder departed the physical incident area. The Resource Tracking Module 240 may update the deployment record to include the exit timestamp and may change the deployment status flag to "demobilized."

In some embodiments, the recorded entry timestamps and exit timestamps enable calculation of personnel assignment periods showing exactly how long each responder was deployed within the physical incident area. For example, when a responder enters the GPS-based geofence at 14:23:15 and exits at 18:47:32, the Resource Tracking Module 240 may calculate that the responder was deployed for 4 hours and 24 minutes. These precise deployment duration records support incident cost accounting, personnel fatigue monitoring, and regulatory compliance reporting requirements that mandate documentation of responder exposure times to hazardous environments.

At step 670, mobilization status and demobilization status are tracked. This operation is performed by the Resource Tracking Module 240, which maintains current deployment state information for all responder resources associated with the digital incident situation. In some embodiments, the Resource Tracking Module 240 may determine mobilization status by identifying which approved responders are currently within the GPS-based geofence based on the most recent GPS location data comparisons. Responders within the GPS-based geofence may be assigned a mobilization status of "deployed," "active," or "on-scene" indicating they are participating in incident operations within the physical incident area.

In some embodiments, the Resource Tracking Module 240 may determine demobilization status based on explicit demobilization actions rather than automatic geofence-based status changes. In typical implementations, responders transition to demobilized status through self-demobilization where users manually indicate they are ending their deployment through the User Interface Module 265, or through administrator-imposed demobilization where situation owners or administrators explicitly change a responder's status to demobilized. This manual approach recognizes that responders may temporarily exit the GPS-based geofence for operational reasons such as transporting patients to hospitals outside the incident area, retrieving equipment or supplies from staging areas, or coordinating with external agencies without intending to demobilize from the incident. In some embodiments, the Resource Tracking Module 240 may implement time-based automatic demobilization where responders who have remained outside the GPS-based geofence for a configured time threshold such as 30 minutes, 1 hour, or 2 hours are automatically transitioned to demobilized status, with notifications transmitted to the affected responders and incident commanders to confirm the status change. Responders assigned a demobilization status of "demobilized," "released," or "off-scene" are indicated as no longer actively deployed to the incident. The Resource Tracking Module 240 may maintain mobilization status and demobilization status fields in the deployment tracking records stored in the Data Repository 280, updating these fields when explicit demobilization actions are processed or when time-based demobilization thresholds are exceeded.

In some embodiments, the tracked mobilization status and demobilization status enable incident commanders to generate operational summaries showing how many responders are currently deployed, how many have been released, and how many are en route but have not yet entered the physical incident area. For example, an incident status report may indicate "23 responders mobilized, 8 responders demobilized, 12 responders approved but not yet on-scene" based on the mobilization status and demobilization status data maintained by the Resource Tracking Module 240. This status visibility supports resource management decisions such as determining whether additional responders need to be requested or whether sufficient personnel are deployed.

At step 680, shift-work rotation times are monitored for long-duration incidents. This operation is performed by the Resource Tracking Module 240, which calculates elapsed deployment times and identifies responders approaching maximum shift durations. In some embodiments, the Resource Tracking Module 240 may continuously calculate the time difference between each responder's entry timestamp and the current system time to determine how long they have been deployed within the physical incident area. The Resource Tracking Module 240 may compare calculated deployment durations to configured shift duration thresholds such as 8 hours, 12 hours, or 16 hours based on incident type and organizational policies.

In some embodiments, when a responder's deployment duration approaches or exceeds the configured shift duration threshold, the Resource Tracking Module 240 may generate shift rotation alerts transmitted to incident commanders via the User Interface Module 265. The alerts may identify specific responders requiring relief, their current deployment durations, and recommended replacement schedules. For example, when a wildfire evacuation incident extends over multiple days, the Resource Tracking Module 240 may alert incident commanders that paramedic "Arthur Marshall" has been deployed for 11 hours and 45 minutes, approaching the 12-hour maximum shift duration, and should be scheduled for relief within the next 15 minutes to prevent responder fatigue and maintain operational safety.

In some embodiments, the shift-work rotation time monitoring may support automated scheduling recommendations where the Resource Tracking Module 240 suggests specific replacement personnel from the pool of approved responders who are currently demobilized or staged outside the GPS-based geofence. The monitoring functionality ensures that long-duration incidents maintain fresh personnel deployment, preventing situations where exhausted responders remain on-scene beyond safe operational limits. The Resource Tracking Module 240 may log all shift rotation events to the Audit Module 260, documenting when personnel were relieved, who replaced them, and what their total deployment durations were for the incident lifecycle.

FIG. 7 is a flow diagram illustrating an exemplary operational sequence of the Communication Module 250 in accordance with certain embodiments. The sequence shown may be implemented as computer-executable instructions within the application program 200 operating on computing system 100 of FIG. 2, with specific operations performed by the modules depicted therein.

At step 710, notification of digital incident situation creation is received. This operation may be performed by the Communication Module 250, which receives notification from the Situation Management Module 210 when a new digital incident situation is established. In some embodiments, the notification may be transmitted automatically as part of the situation creation workflow described in FIG. 3, specifically following the geofence activation at step 350. The notification message may contain the unique identifier for the newly created digital incident situation, the situation owner identifier, the incident name, and configuration parameters indicating communication requirements for the incident type.

At step 720, a general communication channel is automatically generated upon situation creation. This operation is performed by the Communication Module 250 without requiring explicit requests from the situation owner or administrator. In some embodiments, the Communication Module 250 may generate a channel identifier for the general communication channel using UUID generation methods similar to those described in FIG. 3. The Communication Module 250 may create a communication channel record in the Data Repository 280 via the Database Engine 270 containing fields for the channel identifier, the unique identifier linking the general communication channel to the digital incident situation, a channel name defaulted to "General" or "Main Channel," a channel type field indicating general communication characteristics, and an encryption flag set to FALSE indicating non-encrypted communications.

In some embodiments, the Communication Module 250 may establish communication infrastructure for the general communication channel by allocating server resources, creating message queues for storing transmitted messages, establishing WebSocket connections to enable real-time message delivery, and provisioning VoIP conference bridges when voice communication capabilities are required. The automatic generation ensures that immediate coordination capability is available as soon as the digital incident situation is created, eliminating setup delays that would occur if communication channels required manual creation by situation owners. For example, when a fire chief creates a "School shooting" incident situation, the Communication Module 250 immediately establishes a "General" channel enabling the first approved responders to begin operational coordination without waiting for the fire chief to manually configure communications.

At step 730, the general communication channel is configured with standard encryption protocols. This operation is performed by the Communication Module 250, which applies Transport Layer Security (TLS) encryption for data in transit and file system encryption for data at rest to all communication channels in the system. In some embodiments, all messages transmitted through the general communication channel are encrypted during transmission using TLS 1.2 or TLS 1.3 protocols to prevent interception over the Network 190. The Communication Module 250 may additionally ensure that all stored messages are encrypted at rest through file system-level encryption mechanisms provided by the underlying storage infrastructure. The distinction between the general communication channel and private channels is not encryption level but rather access control permissions, as all channels implement the same encryption standards for data protection during transit and storage.

In some embodiments, the non-encrypted configuration may be appropriate for general communication channels because operational coordination messages typically do not contain sensitive information requiring confidentiality protection. Messages such as "Engine 5 arriving on scene," "Evacuate to secondary staging area," or "Medical team request additional supplies" convey operational status that benefits from broad distribution rather than restricted access. The Communication Module 250 may document the non-encrypted configuration in the channel record to inform users that messages transmitted through the general communication channel are not confidential.

At step 740, access to the general communication channel is granted to all approved users. This operation is performed by the Communication Module 250 in coordination with the Access Control Module 230. In some embodiments, the Communication Module 250 may configure channel access permissions by setting an access control policy indicating that any user granted access to the digital incident situation through the access request approval workflow described in FIG. 5 automatically receives access to the general communication channel. The Communication Module 250 may query the Access Control Module 230 to retrieve the list of approved user identifiers for the situation and may create channel membership records associating each approved user with the general communication channel identifier.

In some embodiments, when new responders are subsequently approved for access to the digital incident situation, the Access Control Module 230 may notify the Communication Module 250 of the approval event. The Communication Module 250 may automatically grant the newly approved user access to the general communication channel without requiring additional authorization steps. This automatic access ensures that all approved users can participate in operational coordination immediately upon gaining access to the incident. For example, when a HEMS (Llano) paramedic receives approval to access a wildfire evacuation incident, they immediately see the "General" channel available in their communication interface and can begin sending and receiving coordination messages without requesting separate channel access.

At step 750, a request for a private encrypted communication channel is received. This operation is performed by the Communication Module 250, which receives channel creation requests from situation owners or administrators via the User Interface Module 265. In some embodiments, situation owners may submit private channel creation requests through channel management interfaces where they specify channel parameters including channel name, participant list, and security classification requirements. The channel creation request may indicate that the private encrypted communication channel should support confidential communications for agency-specific coordination, tactical operations, medical information, law enforcement activities, or command-level discussions.

In some embodiments, the request may specify security classification requirements such as "Agency Only," "Tactical," "Medical Confidential," or "Command Staff Only" that define which users should have access to the private encrypted communication channel. For example, when coordinating a school shooting incident involving law enforcement agencies, the situation owner may request creation of a private encrypted communication channel named "Law Enforcement Tactical" with security classification "Tactical" restricted to approved users from police agencies to enable confidential coordination of tactical response activities without broadcasting sensitive information through the general communication channel accessible to all responding agencies.

At step 760, the private communication channel is created based on channel type and access requirements. This operation is performed by the Communication Module 250, which establishes the requested channel with appropriate access control configurations. In some embodiments, when a Direct Private channel is requested, the Communication Module 250 may create a channel accessible only to the specifically identified participants, typically two or more individuals engaging in confidential communications that cannot be accessed by any other users including situation owners or administrators. The Communication Module 250 may generate a channel identifier, create a channel record in the Data Repository 280 with channel type set to "Direct Private," and create channel membership records linking only the specified participant user identifiers to the channel identifier. Direct Private channels provide peer-to-peer confidential communications isolated from broader situation coordination activities.

In some embodiments, when a Situation Private channel is requested, the Communication Module 250 may create a channel where access requires invitation or approval from the channel creator or designated channel administrators. The Communication Module 250 may generate a channel identifier and create a channel record with channel type set to "Situation Private" and an approval-required flag set to TRUE. When users request access to Situation Private channels, the Communication Module 250 may transmit approval request notifications to the channel owner or designated channel administrators via the User Interface Module 265. Upon receiving approval decisions, the Communication Module 250 may grant or deny channel access accordingly. Situation Private channels enable operational groups such as tactical teams, medical coordination units, or command staff to maintain controlled communications where participation is limited to approved members based on operational roles or security requirements In some embodiments, when a Situation Public channel is requested, the Communication Module 250 may create a channel accessible to all approved users for the digital incident situation without requiring additional approval beyond situation-level access. Situation Public channels function similarly to the automatically generated general communication channel, providing broad operational coordination capability for topic-specific or function-specific communications such as "Logistics," "Medical Coordination," or "Evacuation Updates" while remaining accessible to all situation participants. The Communication Module 250 may create channel membership records associating all currently approved users with the Situation Public channel identifier and may automatically grant channel access to users who are subsequently approved for situation participation.

In some embodiments, the Communication Module 250 may establish encrypted communication infrastructure by configuring Transport Layer Security (TLS) protocols for data transmission, generating encryption keys for symmetric encryption of channel messages, and distributing encryption keys securely to authorized participants. The Communication Module 250 may use AES-256 encryption, RSA public key encryption, or other cryptographic algorithms to ensure that messages transmitted through the private encrypted communication channel cannot be intercepted or read by unauthorized parties. In some embodiments, the Communication Module 250 may implement end-to-end encryption where messages are encrypted on the sending user's computing device 145, transmitted in encrypted form through the Network 190, and decrypted only on receiving users' computing devices 145, preventing the server infrastructure from accessing plaintext message content.

At step 770, channel access is assigned based on security classification requirements. This operation is performed by the Communication Module 250, which determines which users should receive access to the private encrypted communication channel. In some embodiments, the Communication Module 250 may evaluate the security classification requirements specified in the creation request to identify appropriate participants. When the security classification indicates "Agency Only," the Communication Module 250 may query the Access Control Module 230 to retrieve all approved users affiliated with a specific agency and may grant channel access only to those users. When the security classification indicates "Tactical," the Communication Module 250 may identify users assigned to tactical roles such as entry supervisors, team leaders, or incident commanders and may restrict access to those roles.

In some embodiments, the Communication Module 250 may create channel membership records in the Data Repository 280 associating each authorized user identifier with the private encrypted communication channel identifier. The Communication Module 250 may also distribute encryption keys to authorized participants by transmitting key material through secure channels established with each participant's user computing device 145. Unauthorized users who are not included in the channel membership records cannot access the private encrypted communication channel, cannot view messages transmitted through the channel, and may not even see the channel listed in their communication interfaces. For example, when a "Law Enforcement Tactical" channel is created with security classification restricting access to police agencies, paramedics and firefighters approved for the incident do not see the channel in their interfaces, ensuring that tactical law enforcement communications remain confidential.

At step 780, the communication channel configuration is stored and access is enabled. This operation is performed by the Communication Module 250, which persists channel configuration data and notifies authorized users of channel availability. In some embodiments, the Communication Module 250 may execute database write operations via the Database Engine 270 to store the complete channel record including channel identifier, situation identifier, channel name, channel type, encryption settings, security classification, and channel membership records. The Communication Module 250 may also transmit channel availability notifications to authorized users' computing devices 145 via the User Interface Module 265, informing them that a new communication channel is available for incident coordination.

In some embodiments, the User Interface Module 265 may update communication interfaces on user computing devices 145 to display the newly created channel in channel lists, enabling authorized users to select the channel and begin sending and receiving messages. For the general communication channel created automatically in step 720, the channel becomes available immediately upon situation creation, enabling the first approved responder to send the first coordination message. For private encrypted communication channels created on request in step 760, the channels become available only to authorized participants based on security classification requirements, enabling secure communications for sensitive operational activities. The stored channel configurations persist throughout the incident lifecycle, supporting continuous operational coordination until the digital incident situation is demobilized and communication channels are archived.

FIG. 8 is a flow diagram illustrating an exemplary end-to-end system operational flow in accordance with certain embodiments. The sequence shown may be implemented as computer-executable instructions within the application program 200 operating on computing system 100 of FIG. 2, demonstrating the integrated operation of multiple modules to process incident coordination from initial situation creation through ongoing resource management and federal compliance reporting.

At step 810, a situation creation request is received from a situation owner via the network. This operation may be performed by the User Interface Module 265, which receives the request from user computing devices 145 via the Network 190. In some embodiments, a police sergeant responding to an active shooter report at a school may access the incident management platform through a mobile application on their smartphone and may complete a situation creation form displayed by the User Interface Module 265. The police sergeant may enter "School shooting" as the incident name, may select "active threat" from a dropdown menu of predefined incident types, may tap on the school's location on an interactive map interface to specify the incident location coordinates, and may drag a radius slider control to set an initial geofence radius of 1 mile encompassing the school campus and surrounding streets.

In some embodiments, when a wildfire threatens residential areas near Camp Bullis, Texas, a fire chief may similarly create a situation by entering "Wildland Fire Evac. near Camp Bullis" as the incident name, selecting "wildfire" as the incident type, tapping on the fire origin point on the map interface to specify incident location, and setting an initial geofence radius of 4 miles. The User Interface Module 265 may validate that required fields are completed and may transmit the situation creation request to the Situation Management Module 210 containing the incident name, incident type, incident location coordinates, and requested geofence radius.

At step 820, a digital incident situation with a unique identifier is generated and administrative control is assigned. This operation is performed by the Situation Management Module 210 as described in steps 320 and 330 of FIG. 3. In some embodiments, the Situation Management Module 210 may generate a UUID that uniquely identifies the digital incident situation, distinguishing the "School shooting" incident from all other concurrent operations in the system. The Situation Management Module 210 may create access control list entries in the Data Repository 280 assigning the police sergeant as the situation owner with full administrative permissions including authority to adjust the GPS-based geofence boundaries, approve or deny access requests from responder users, create private encrypted communication channels, and transfer ownership to other incident commanders.

In some embodiments, the assigned administrative control may enable the situation owner to perform operations restricted to authorized personnel. For example, when tactical conditions evolve during the school shooting response and the police sergeant needs to adjust the physical incident area boundaries, the administrative permissions enable the police sergeant to access geofence adjustment interfaces and modify the adjustable center point or adjustable radius without requiring approval from external authorities. The permission structure stored in the Data Repository 280 links the situation owner identifier to the unique identifier with elevated permission flags that govern which system functions the situation owner may access throughout the incident lifecycle.

At step 830, a GPS-based geofence comprising an adjustable center point and an adjustable radius is established. This operation is performed by the Geofencing Module 220 as described in FIG. 4. In some embodiments, the Geofencing Module 220 may receive a geofence initialization request from the Situation Management Module 210 containing the incident location coordinates and the requested geofence radius. The Geofencing Module 220 may define the adjustable center point at the latitude and longitude coordinates corresponding to the school's location and may set the adjustable radius to 1 mile, establishing the GPS-based geofence that defines the physical incident area.

In some embodiments, the Geofencing Module 220 may store the adjustable center point coordinates and adjustable radius value in the Data Repository 280 and may calculate derived parameters including the radius in meters for distance calculations, the radius squared for computational optimization, and bounding box coordinates defining the minimum and maximum latitude and longitude values encompassing the circular physical incident area. For the wildfire scenario, the Geofencing Module 220 may similarly establish a GPS-based geofence with an adjustable center point at the Camp Bullis fire origin and an adjustable radius of 4 miles, providing a larger physical incident area appropriate for wildfire evacuation operations.

In some embodiments, as incidents evolve, the situation owner may adjust the GPS-based geofence in real-time by submitting adjustment requests through the User Interface Module 265. When the school shooting threat is contained within the building with no indication of additional suspects in surrounding areas, the police sergeant may reduce the adjustable radius from 1 mile to 0.5 miles, focusing the physical incident area on the immediate school campus. The Geofencing Module 220 may receive this adjustment request, may update the adjustable radius in real-time, may recalculate derived parameters and bounding box coordinates, and may transmit the adjusted GPS-based geofence boundaries to the Resource Tracking Module 240. Conversely, when the wildfire spreads over several hours, the fire chief may increase the adjustable radius from 4 miles to 10 miles and later to 40 miles as evacuation zones expand, with the Geofencing Module 220 dynamically updating the GPS-based geofence boundaries to track the growing physical incident area.

At step 840, a general communication channel is automatically created and additional communication channels may be created by situation members. This operation is performed by the Communication Module 250 as described in FIG. 7. In some embodiments, immediately upon creation of the digital incident situation, the Communication Module 250 may automatically generate a general communication channel without requiring explicit requests from the situation owner. The Communication Module 250 may create a channel record in the Data Repository 280 with a channel name defaulted to "General," a channel type indicating GENERAL characteristics, and an access level field specifying that all approved users may access the channel. All communication channels implement Transport Layer Security (TLS) encryption for data in transit and operating system-level or database-level encryption for data at rest, ensuring that all communications are protected regardless of channel type. Following situation creation, any approved situation member may create additional communication channels by submitting channel creation requests through the User Interface Module 265, specifying channel parameters including channel name, channel type selection such as SITUATION_PUBLIC, SITUATION_PRIVATE, or DIRECT_PRIVATE, and initial participant lists. The user who creates a channel is automatically assigned as the channel owner by default, receiving administrative permissions to manage channel membership, approve access requests, and configure channel settings. When channels are created with channel type SITUATION_PRIVATE or DIRECT_PRIVATE, access is restricted to users who are explicitly invited by the channel owner or who submit access requests and receive approval from the channel owner or designated channel administrators. This decentralized channel creation capability enables situation members to establish specialized communication pathways for operational coordination without requiring situation owner involvement in every channel establishment decision.

In some embodiments, the Communication Module 250 may establish communication infrastructure by allocating server resources, creating message queues, and establishing WebSocket connections for real-time message delivery. The automatic creation ensures that immediate coordination capability is available when the first responders gain access to the digital incident situation. For the school shooting incident, initial responding officers may begin transmitting coordination messages through the general communication channel such as "Unit 3 establishing north perimeter," "EMS staged at rally point awaiting clearance," and "Command post established at fire station."

In some embodiments, as tactical operations develop, situation members may recognize needs for restricted communications that should be limited to specific operational groups rather than broadcast through the general communication channel accessible to all responding personnel. Any approved situation member such as a police sergeant, tactical team leader, medical coordinator, or incident commander may create additional communication channels by accessing channel management interfaces on their user computing device 145, specifying a channel name such as "LE Tactical," "Command Staff," or "Medical Coordination," selecting a channel type such as SITUATION_PRIVATE or DIRECT_PRIVATE, and identifying initial participants or defining access criteria. The user who creates the channel is automatically designated as the channel owner with administrative permissions to manage channel membership and approve access requests. The Communication Module 250 may create the communication channel record in the Data Repository 280 with the specified channel type, where channel type selection determines access control requirements rather than encryption level, as all communication channels implement Transport Layer Security (TLS) encryption for data in transit and operating system-level or database-level encryption for data at rest. When the channel type is SITUATION_PRIVATE, access is restricted to users who are explicitly invited by the channel owner or who submit channel access requests and receive approval from the channel owner or designated channel administrators. When the channel type is DIRECT_PRIVATE, access is limited to the specifically identified participants designated during channel creation, typically supporting confidential two-party or small-group communications between specific individuals.

In some embodiments, for the wildfire incident, the fire chief may similarly request creation of multiple private encrypted communication channels for different operational functions. A "Command Staff" channel may be created with security classification restricting access to incident command personnel from participating agencies, enabling confidential discussion of resource allocation decisions and tactical priorities. A "Medical Coordination" channel may be created restricting access to EMS supervisors and hospital personnel, enabling discussion of patient conditions and transport priorities without broadcasting sensitive medical information through the general communication channel. This multi-channel architecture supports parallel coordination where general operational updates flow through the automatically created general communication channel while sensitive tactical, medical, or command discussions occur through private encrypted communication channels based on security classification requirements.

At step 850, access requests from responder users are received and validated at multiple permission levels. This operation is performed by the Access Control Module 230 as described in FIG. 5. In some embodiments, as the school shooting incident is broadcast through regional dispatch systems and mutual aid notifications, responders from multiple agencies may access the incident management platform on their user computing devices 145 and may submit access requests. A tactical paramedic from HEMS (Llano) medical helicopter service may browse the active situations list displayed by the User Interface Module 265, may select the "School shooting" incident, and may submit an access request specifying their requested team assignment as "Medic 22."

In some embodiments, the Access Control Module 230 may validate the access request at agency level and individual level. The Access Control Module 230 may query the Data Repository 280 to verify that HEMS (Llano) is a pre-registered response agency authorized to participate in active threat incidents in the region. The Access Control Module 230 may retrieve the requester's credential records and may verify that the paramedic identified as "Arthur Marshall" possesses current certifications including "Tactical Paramedic, Flight Paramedic, Admin" qualifications appropriate for tactical medical response operations. The Access Control Module 230 may compare certification expiration dates to the current system date to ensure credentials are current rather than expired.

In some embodiments, following successful agency-level and individual-level validation, the Access Control Module 230 may determine multi-level access permissions by evaluating requirements at situation-level, agency-level, team-level, and individual-level. The Access Control Module 230 may verify that the digital incident situation is configured to accept access requests from medical response agencies at situation-level. The Access Control Module 230 may verify that HEMS (Llano) has been granted authorization to participate at agency-level through mutual aid agreements or incident-specific agency authorizations. The Access Control Module 230 may verify that the requested "Medic 22" team assignment is a valid operational unit at team-level and that Arthur Marshall's credentials qualify him for medical team assignment. The Access Control Module 230 may determine individual-level permissions defining which system functions Arthur Marshall should be granted access to, such as viewing GPS locations of other responders, accessing communication channels, and submitting status updates.

In some embodiments, the Access Control Module 230 may assign Arthur Marshall to the "Medic 22" response team based on his requested operational unit assignment and may create a team membership record in the Data Repository 280 linking his user identifier to the team identifier and the unique identifier for the digital incident situation. The Access Control Module 230 may generate an approval request notification and may transmit it to the police sergeant's user computing device 145 via the User Interface Module 265. The notification may display Arthur Marshall's member profile including his name, agency affiliation "HEMS (Llano)," rank "Paramedic," credentials "Tactical Paramedic, Flight Paramedic, Admin," contact phone number, and current GPS coordinates showing he is staged at a helibase awaiting deployment authorization.

In some embodiments, the police sergeant may review the member profile information and may evaluate whether Arthur Marshall should be approved for access. The police sergeant may consider factors such as whether tactical medical support is needed, whether the operational situation is stable enough to permit medical personnel entry, and whether Arthur Marshall's credentials are appropriate for the incident type. The police sergeant may tap an "Approve" button on the approval interface, generating an approval decision that is transmitted to the Access Control Module 230. The Access Control Module 230 may process the approval by updating Arthur Marshall's access request status to "approved," creating permission records granting him access to the digital incident situation and the general communication channel, and transmitting an approval notification to Arthur Marshall's user computing device 145.

In some embodiments, for the wildfire incident, similar access request workflows may enable the fire chief to review and approve requests from mutual aid resources including firefighters from neighboring jurisdictions, heavy equipment operators, dozer operators, and specialized wildland fire teams. A firefighter from a distant agency may submit an access request and the Access Control Module 230 may validate their credentials showing certifications in "Wildland Firefighting, Structure Protection, Heavy Equipment Operation." The fire chief may review their qualifications and equipment capabilities and may approve them for assignment to specific operational divisions such as "Division Alpha" or "Strike Team 1" within the incident organizational structure. The multi-level access permission validation ensures that only qualified, authorized personnel gain access to incident operations.

At step 860, GPS location data from approved responders is continuously received and compared to the GPS-based geofence boundaries. This operation is performed by the Resource Tracking Module 240 as described in FIG. 6. In some embodiments, following approval, Arthur Marshall's user computing device 145 may activate GPS tracking functionality and may begin transmitting GPS location data packets to the Resource Tracking Module 240 at regular intervals such as every 10 seconds. Each GPS location data packet may contain Arthur Marshall's user identifier, the situation identifier, latitude and longitude coordinates obtained from GPS/Location Services 290, altitude, GPS accuracy radius, heading, speed, and a timestamp indicating when the coordinates were captured.

In some embodiments, the Resource Tracking Module 240 may parse received GPS location data to extract the latitude and longitude coordinates and may compare these GPS coordinates to the GPS-based geofence boundaries by retrieving the current adjustable center point and adjustable radius from the Geofencing Module 220. The Resource Tracking Module 240 may calculate the distance between Arthur Marshall's GPS coordinates and the adjustable center point using the Haversine formula that computes great-circle distance accounting for Earth's curvature. When the calculated distance is less than or equal to the adjustable radius, the Resource Tracking Module 240 may determine that Arthur Marshall is within the GPS-based geofence. When the calculated distance exceeds the adjustable radius, the Resource Tracking Module 240 may determine that Arthur Marshall is outside the GPS-based geofence.

In some embodiments, as the HEMS (Llano) helicopter departs the staging helibase and flies toward the school shooting incident, Arthur Marshall's GPS coordinates may initially be 15 miles from the adjustable center point, exceeding the 1-mile adjustable radius. The Resource Tracking Module 240 may determine that he is outside the GPS-based geofence and may set his position status to "outside_geofence." As the helicopter approaches the school and crosses within 0.9 miles of the adjustable center point, the Resource Tracking Module 240 may detect that the calculated distance is now less than the 1-mile adjustable radius and may update Arthur Marshall's position status to "within_geofence." The Resource Tracking Module 240 may identify this status change as an entry event indicating Arthur Marshall has crossed into the physical incident area.

At step 870, GPS locations are selectively displayed on map interfaces when responders are within the GPS-based geofence and suppressed when outside. This operation is performed by the Resource Tracking Module 240 in coordination with the User Interface Module 265 as described in steps 640 and 650 of FIG. 6. In some embodiments, the Resource Tracking Module 240 may filter the set of all tracked responder GPS locations before transmitting position data to the User Interface Module 265, including only responders whose position status indicates "within_geofence" while excluding responders whose position status indicates "outside_geofence."

In some embodiments, for responders determined to be within the GPS-based geofence, the Resource Tracking Module 240 may transmit position display messages to the User Interface Module 265 containing GPS coordinates, user identifiers, names, agency affiliations, role assignments, and timestamps. The User Interface Module 265 may render these GPS locations as position markers overlaid on map interfaces displayed on the police sergeant's user computing device 145. The map display may show position markers for tactical officers positioned around the school perimeter, medical personnel staged at rally points, and command staff coordinating from mobile command posts, with each marker labeled with the responder's name and agency such as "HEMS (Llano)—Arthur Marshall—Paramedic."

At step 880, entry timestamps and exit timestamps are recorded for responder deployments. This operation is performed by the Resource Tracking Module 240, which detects boundary crossing events when responders transition from outside to inside the GPS-based geofence or from inside to outside based on GPS coordinate comparisons in step 860. In some embodiments, the Resource Tracking Module 240 may record an entry timestamp with millisecond precision when detecting entry events and may store deployment tracking records in the Data Repository 280 via the Database Engine 270 containing the user identifier, situation identifier, entry timestamp, GPS coordinates where entry occurred, and deployment status flag set to "active." When detecting exit events, the Resource Tracking Module 240 may record exit timestamps and may update deployment records to include exit timestamp and deployment status changed to "demobilized." The Resource Tracking Module 240 may calculate deployment durations by subtracting entry timestamps from exit timestamps to determine elapsed time within the physical incident area. For example, when a HEMS paramedic enters at 14:23:15 and exits at 18:47:32, the Resource Tracking Module 240 may calculate a deployment duration of 4 hours, 24 minutes, and 17 seconds. These precise deployment duration calculations enable incident cost accounting based on actual time spent within the operational area.

In some embodiments, for long-duration incidents spanning multiple days, the Resource Tracking Module 240 may track multiple entry-exit cycles for each responder by creating separate deployment tracking records for each deployment period as responders rotate through shift-work cycles. The Resource Tracking Module 240 may aggregate deployment durations across multiple cycles to calculate total deployment time and may compare current deployment durations to configured shift duration thresholds such as 12 hours or 16 hours. When responders approach configured thresholds, the Resource Tracking Module 240 may generate shift rotation alerts transmitted to incident commanders via the User Interface Module 265 identifying specific responders requiring relief and their current deployment durations. For example, when a tactical officer reaches 11 hours and 45 minutes approaching a 12-hour maximum, the Resource Tracking Module 240 may alert "Officer J. Rodriguez approaching 12-hour limit, currently at 11 h 45 m, recommend relief within 15 minutes." This automated tracking based on GPS-based geofence boundary crossings eliminates reliance on manual time-keeping and enables real-time fatigue monitoring to maintain safe operational thresholds.

At step 890, comprehensive audit trails are generated throughout the incident lifecycle. This operation is performed by the Audit Module 260, which receives logging requests from all system modules and generates timestamped records documenting all system activities. In some embodiments, the Audit Module 260 may log situation creation events, geofence establishment and real-time adjustments to adjustable center point or adjustable radius, access requests with multi-level permission validation results at situation-level, agency-level, team-level, and individual-level, approval or denial decisions from situation owners, GPS location data and boundary crossing events, entry timestamps and exit timestamps with calculated deployment durations, mobilization events and demobilization events, communication channel creations and message activities, and all administrative actions. Each audit record may include situation identifiers, user identifiers, assigned roles and permissions at time of action, GPS coordinates, geofence parameters, precise timestamps enabling chronological reconstruction, and contextual data documenting system state. The Audit Module 260 may store audit records in the Data Repository 280 using tamper-evident logging mechanisms that prevent modification or deletion, creating verifiable documentation for after-action reviews, regulatory compliance reporting, and legal proceedings following major incidents.

In some embodiments, the Database Engine 270 may compile incident data from audit trails and deployment tracking records to generate incident documentation supporting cost recovery processes. The Database Engine 270 may calculate personnel costs by processing deployment durations against pay rate tables containing regular hourly rates, overtime multipliers, emergency pay premiums, and hazard pay rates, then multiplying calculated deployment hours by applicable rates to generate personnel cost summaries organized by agency, role, and operational period. For example, a school shooting incident with 47 law enforcement personnel deployed for average 6.6 hours at $152 per hour may generate $47,350 in law enforcement costs, 18 medical personnel for 5.2 hours at $195 per hour may total $18,200, and 12 command staff for 6.5 hours at $154 per hour may total $11,800, yielding total personnel costs of $77,350. The Database Engine 270 may track equipment costs when helicopters, mobile command posts, or heavy equipment cross GPS-based geofence boundaries, calculating equipment deployment hours and applying configured rates such as $3,500 per hour for helicopter operations. The Database Engine 270 may structure incident data in formats compatible with Federal Emergency Management Agency (FEMA) Incident Command System (ICS) forms including ICS-201 Incident Briefing, ICS-214 Unit Log, and ICS-215 Operational Planning Worksheet requirements, organizing situation records, deployment tracking records, and GPS location data to align with FEMA Public Assistance reimbursement documentation and National Incident Management System (NIMS) reporting standards for potential future integration with external emergency response systems.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. In the context of the disclosed incident management platform, the application may comprise a user interface and related logic that can be downloaded and executed on mobile computing devices such as smartphones, enabling field responders to interact with the incident management system through native mobile applications. The application may also comprise a set of Representational State Transfer (REST) APIs or WebSocket APIs that are deployed on server infrastructure and can be addressed via HTTPS (Hypertext Transfer Protocol Secure) or WSS (WebSocket Secure) protocols. The server-side APIs may be accessed via the public Internet when appropriate security tokens such as JSON Web Tokens (JWT), OAuth credentials, or API keys are provided for authentication and authorization. Each application generally has its own user interface, which enables a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which enable a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API enables programmers to use predefined functions to interact with an operating system, instead of writing them from scratch. Common computer operating systems, including Windows, Unix, and the Mac OS, usually provide an API for programmers. An API is also used by hardware devices that run software programs. The term API as used herein also includes web-based APIs such as Representational State Transfer (REST) APIs and WebSocket APIs, which enable client applications to communicate with server-side applications over network protocols. REST APIs utilize HTTP or HTTPS protocols to enable stateless client-server interactions where client applications submit requests to server endpoints and receive structured responses typically formatted in JSON or XML. WebSocket APIs establish persistent bidirectional communication channels between clients and servers, enabling real-time data exchange for applications requiring continuous updates such as location tracking, messaging, or live status monitoring. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

We claim:

1. A computer-implemented emergency incident management system for enabling multi-agency communication during emergency incidents, the system comprising: at least one computing device having a hardware processor and operable to communicate with a network; a server having a hardware processor and operable to communicate with the at least one user computing device over the network, the server configured to host an incident management platform comprising: a situation management module stored in memory and configured to create a digital incident situation in response to a situation creation request from a situation owner, wherein the situation owner is granted administrative control over the digital incident situation; a geofencing module configured to establish a GPS-based geofence for the digital incident situation, wherein the GPS-based geofence comprises a center point and a radius defining a physical incident area, and wherein the geofencing module is further configured to adjust the center point or the radius in response to incident changes; an access control module stored in memory and configured to receive access requests from a plurality of responder users and to grant or deny access to the digital incident situation based on approval from the situation owner or an administrator, wherein the access control module implements multi-level access permissions comprising situation-level permissions, agency-level permissions, team-level permissions, and individual-level permissions, wherein the situation-level permissions define administrative control over creation and termination of the digital incident situation, wherein the agency-level permissions define pre-approval of responder users affiliated with specific emergency response agencies, wherein the team-level permissions define access rights for pre-configured response teams comprising multiple individual responders, and wherein the individual-level permissions define access rights for individual responder users based on credentials and role assignments; a resource tracking module stored in memory and configured to monitor GPS locations of responder resources within the GPS-based geofence, to prevent display of the GPS locations of the responder resources on a map interface until the responder resources physically enter the GPS-based geofence, and to display the GPS locations on a map interface when the responder resources are located within the GPS-based geofence, wherein the responder resources comprise human personnel and physical equipment associated with emergency response operations; and a communication module stored in memory and configured to automatically generate a general communication channel upon creation of the digital incident situation and to create at least one communication channel with encrypted data transmission.

2. The system of claim 1, wherein the network comprises an internet protocol network, and wherein the incident management platform provides communications infrastructure that replaces tower-based radio communication systems.

3. The system of claim 1, wherein the incident management platform further comprises an audit module configured to generate comprehensive records documenting all activities within the digital incident situation, wherein the comprehensive records comprise timestamped data for human movements, GPS locations, communication threads, access requests, access approvals, access denials, and multimedia content.

4. The system of claim 1, wherein the access control module is further configured to organize the plurality of responder users into response teams, wherein each response team comprises a plurality of individual responders assigned to a common operational unit.

5. The system of claim 1, wherein a resource tracking module is configured to track mobilization status and demobilization status of the response teams over a duration of the digital incident situation.

6. The system of claim 1, wherein the access control module is further configured to implement multi-level access permissions comprising situation-level permissions, agency-level permissions, team-level permissions, and individual-level permissions.

7. The system of claim 1, wherein the incident management platform further comprises a location marking module configured to receive pin-drop location markers from the plurality of responder users, wherein the pin-drop location markers designate strategic locations within the GPS-based geofence.

8. The system of claim 5, wherein the resource tracking module is further configured to track shift-work rotations for the response teams during long-duration emergency incidents spanning multiple days, wherein tracking shift-work rotations comprises recording mobilization times and demobilization times for personnel assignment periods.

9. The system of claim 1, wherein the incident management platform is further configured to integrate with a Federal Emergency Management Agency (FEMA) National Incident Management System (NIMS) for incident command reporting.

10. The system of claim 1, wherein the resource tracking module is further configured to track physical equipment comprising emergency response vehicles and apparatus, wherein tracking the physical equipment comprises receiving manual entry identification data for the physical equipment.

11. The system of claim 9, wherein the incident management platform is further configured to capture incident data in a format compatible with standard FEMA reimbursement forms for state reimbursement processing.

12. The system of claim 1, wherein the access control module is further configured to maintain pre-registered user credentials at an agency level and at an individual level, wherein pre-registered user credentials enable expedited access approval for the digital incident situation.

13. A computer-implemented method, executed by at least one processor of a computing device, for managing emergency incident communications and resource coordination, the method comprising: receiving, via the computing device, a situation creation request from a situation owner; creating, via the computing device, a digital incident situation in response to the situation creation request, wherein the situation owner is granted administrative control over the digital incident situation; establishing, via the computing device, a GPS-based geofence for the digital incident situation, wherein the GPS-based geofence comprises a center point and a radius defining a physical incident area; adjusting, via the computing device, the center point or the radius of the GPS-based geofence in response to incident changes; receiving, via the computing device, access requests from a plurality of responder users; granting or denying, via the computing device, access to the digital incident situation based on approval from the situation owner or an administrator; monitoring, via the computing device, GPS locations of responder resources within the GPS-based geofence, wherein the responder resources comprise human personnel and physical equipment associated with emergency response operations; displaying, via the computing device, the GPS locations on a map interface when the responder resources are located within the GPS-based geofence; removing, via the computing device, display of the GPS locations when the responder resources exit the GPS-based geofence; organizing, via the computing device, the plurality of responder users into response teams; tracking, via the computing device, mobilization times and demobilization times for the response teams during shift-work rotations over a multi-day duration of the digital incident situation; automatically generating, via the computing device, a general communication channel upon creation of the digital incident situation; and creating, via the computing device, at least one communication channel with encrypted data transmission.

14. The method of claim 13, further comprising generating, via the computing device, timestamped audit records documenting all activities within the digital incident situation, wherein the timestamped audit records comprise human movements, GPS locations, communication threads, access requests, access approvals, and access denials, and formatting, via the computing device, incident data for integration with Federal Emergency Management Agency (FEMA) reimbursement forms.

15. A software product comprising at least one computer-readable storage medium having application instructions stored on the at least one computer-readable storage medium, the application instructions executable by at least one processor to: receive a situation creation request from a situation owner; create a digital incident situation in response to the situation creation request, wherein the situation owner is granted administrative control over the digital incident situation; establish a GPS-based geofence for the digital incident situation, wherein the GPS-based geofence comprises a center point and a radius defining a physical incident area; adjust the center point or the radius of the GPS-based geofence in response to incident changes;

receive access requests from a plurality of responder users; grant or deny access to the digital incident situation based on approval from the situation owner or an administrator; monitor GPS locations of responder resources within the GPS-based geofence, wherein the responder resources comprise human personnel and physical equipment associated with emergency response operations; prevent display of the GPS locations of the responder resources on a map interface until the responder resources physically enter the GPS-based geofence; display the GPS locations on a map interface when the responder resources are located within the GPS-based geofence; implement multi-level access permissions comprising situation-level permissions, agency-level permissions, team-level permissions, and individual-level permissions; automatically generate a general communication channel upon creation of the digital incident situation; and create at least one communication channel with encrypted data transmission.

\* \* \* \* \*